United States Patent
Russell et al.

(10) Patent No.: US 12,280,770 B1
(45) Date of Patent: Apr. 22, 2025

(54) RISK MITIGATION IN SPEED PLANNING

(71) Applicant: Waymo LLC, Mountain View, CA (US)

(72) Inventors: Jared Stephen Russell, San Francisco, CA (US); Tobias Kunz, San Francisco, CA (US)

(73) Assignee: Waymo LLC, Mountain View, CA (US)

(*) Notice: Subject to any disclaimer, the term of this patent is extended or adjusted under 35 U.S.C. 154(b) by 0 days.

(21) Appl. No.: 18/588,769

(22) Filed: Feb. 27, 2024

Related U.S. Application Data

(63) Continuation of application No. 17/498,907, filed on Oct. 12, 2021, now Pat. No. 11,945,433, which is a continuation of application No. 16/210,652, filed on Dec. 5, 2018, now Pat. No. 11,192,545.

(51) Int. Cl.
| | |
|---|---|
| *B60W 30/09* | (2012.01) |
| *B60W 30/095* | (2012.01) |
| *B60W 30/182* | (2020.01) |
| *G05D 1/00* | (2024.01) |

(52) U.S. Cl.
CPC ........ *B60W 30/09* (2013.01); *B60W 30/0953* (2013.01); *B60W 30/0956* (2013.01); *B60W 30/182* (2013.01); *G05D 1/0088* (2013.01); *G05D 1/0212* (2013.01)

(58) Field of Classification Search
CPC ............ B60W 30/09; B60W 30/0953; B60W 30/0956; B60W 30/182; G05D 1/0088; G05D 1/0212; G05D 2201/0213
See application file for complete search history.

(56) References Cited

U.S. PATENT DOCUMENTS

| | | |
|---|---|---|
| 6,510,388 B1 | 1/2003 | Sporrong et al. |
| 8,126,642 B2 | 2/2012 | Trepagnier et al. |
| 8,521,415 B2 | 8/2013 | Harada |
| 8,676,466 B2 | 3/2014 | Mudalige |
| 9,098,086 B2 | 8/2015 | Humphrey |
| 9,645,577 B1 | 5/2017 | Frazzoli et al. |
| 9,910,441 B2 | 3/2018 | Levinson et al. |
| 10,009,580 B2 | 6/2018 | Offenhaeuser |
| 10,691,127 B2 | 6/2020 | Kobilarov et al. |
| 10,955,842 B2* | 3/2021 | Zeng ..................... G05D 1/0278 |
| 11,643,072 B2* | 5/2023 | Beller ................... B60W 40/08 701/23 |
| 11,643,073 B2* | 5/2023 | Dax .................. G08G 1/096811 701/301 |

(Continued)

FOREIGN PATENT DOCUMENTS

EP    2814014 A1    12/2014

*Primary Examiner* — Thomas Ingram
(74) *Attorney, Agent, or Firm* — Botos Churchill IP Law

(57) ABSTRACT

A first driving solution for a vehicle along a portion of a route is determined based on an agent detected in the vehicle's environment following a first trajectory of a plurality of possible trajectories. A switching time is determined for the vehicle to deviate from the first driving solution for a situation in which the agent is following a second trajectory of the plurality of possible trajectories. The first driving solution is revised such that the vehicle will be able to switch from the revised first driving solution to another driving solution at the switching time in case if the detected agent is following the second trajectory.

22 Claims, 14 Drawing Sheets

(56) References Cited

U.S. PATENT DOCUMENTS

| | | |
|---|---|---|
| 11,787,423 B2 * | 10/2023 | Schiemenz ......... B60W 30/182 |
| | | 701/32.7 |
| 2011/0313664 A1 | 12/2011 | Sakai et al. |
| 2016/0001775 A1 | 1/2016 | Wilhelm et al. |
| 2016/0313133 A1 | 10/2016 | Zeng et al. |
| 2017/0123422 A1 * | 5/2017 | Kentley ................. B60L 15/20 |
| 2019/0111874 A1 | 4/2019 | Harada |
| 2019/0278280 A1 | 9/2019 | Imai et al. |
| 2019/0302777 A1 | 10/2019 | Kindo |
| 2020/0089246 A1 | 3/2020 | McGill et al. |
| 2020/0110416 A1 | 4/2020 | Hong et al. |
| 2021/0402991 A1 * | 12/2021 | Gautam ................. G06N 3/049 |

* cited by examiner

RISK MITIGATION IN SPEED PLANNING

CROSS REFERENCE TO RELATED APPLICATIONS

This application is a continuation of U.S. application Ser. No. 17/498,907, filed Oct. 12, 2021, which is a continuation of U.S. application Ser. No. 16/210,652, filed Dec. 5, 2018, issued as U.S. Pat. No. 11,192,545, the entire disclosures of which are incorporated by reference herein.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). These characteristics can be used to predict trajectories of other objects. These trajectories may define what an object is likely to do for some brief period into the future. These trajectories can then be used to control the vehicle in order to avoid these objects. Thus, detection, identification, and prediction are critical functions for the safe operation of autonomous vehicle.

BRIEF SUMMARY

Aspects of the disclosure provides for receiving, by one or more computing devices, a plurality of possible trajectories for an agent detected in the vehicle's environment; determining, by the one or more computing devices, a first driving solution for the vehicle along a portion of a route based on an external constraint having a first value corresponding to the agent following a first trajectory of the plurality of possible trajectories; determining, by the one or more computing devices, a switching time for the vehicle to deviate from the first driving solution for a situation in which the agent is following a second trajectory of the plurality of possible trajectories; determining, by the one or more computing devices based on the external constraint having a second value corresponding to the agent following the second trajectory of the plurality of possible trajectories, a switching constraint for the switching time, the switching constraint being configured so that satisfying the switching constraint allows the vehicle to switch to another driving solution at the switching time; revising, by the one or more computing devices, the first driving solution based on the switching constraint for the switching time such that the vehicle will be able to switch from the revised first driving solution to another driving solution at the switching time; and operating, by the one or more computing devices, the vehicle based on the revised first driving solution.

Determining the switching time may include identifying a future time at which a confidence level that the agent is following either the first trajectory or the second trajectory meets a confidence threshold. The confidence level may be determined based on a comparison between a predicted state of the agent if the agent is following the first trajectory and a predicted state of the agent if the agent is following the second trajectory. The predicted state may be a predicted position of the agent. The predicted state may be a predicted velocity of the agent.

The switching time may be determined further based on a global discomfort level for a passenger in the vehicle and other road users detected in the vehicle's environment.

The switching constraint for the switching time may be determined further based on an internal constraint being an elevated discomfort level higher than a global discomfort level of the first driving solution for a passenger in the vehicle and other road users detected in the vehicle's environment, and wherein the elevated discomfort level may be determined based on a probability of the agent following the second trajectory. The probability of the agent following the second trajectory may be based on a discomfort level for performing the first trajectory.

The switching constraint may include one or more restricted positions at the switching time that the vehicle avoids in order to be able to switch to another driving solution. The switching constraint may include one or more restricted velocities at the switching time that the vehicle avoids in order to be able to switch to another driving solution.

The method may further comprise determining, by the one or more computing devices while operating the vehicle based on the revised first driving solution at or before the switching time, that a confidence level that the agent is following the second trajectory meets a confidence threshold; operating, by the one or more computing devices, the vehicle by switching from the revised first driving solution to the second driving solution at or before the switching time.

The disclosure further provides for receiving, by one or more computing devices, a plurality of possible trajectories for an agent detected in the vehicle's environment; determining, by the one or more computing devices, a first driving solution for the vehicle along a portion of a route based on an external constraint having a first value corresponding to the agent following a first trajectory of the plurality of possible trajectories; determining, by the one or more computing devices, a switching time for the vehicle to deviate from the first driving solution for a situation in which the agent is following a second trajectory of the plurality of possible trajectories; determining, by the one or more computing devices, a second driving solution for the vehicle based on the external constraint having a second value corresponding to the agent following the second trajectory of the plurality of possible trajectories, wherein the second driving solution has a first segment prior to the switching time, and a second segment after the switching time; determining, by the one or more computing devices, that there is a mismatch between the first segment of the second driving solution and a first segment of the first driving solution prior to the switching time, wherein the mismatch will prevent the vehicle from switching from the first driving solution to the second driving solution at the switching time; revising, by the one or more computing devices, the first driving solution based on the first segment of the second driving solution such that the vehicle will be able to switch from the revised first driving solution to the second driving solution at the switching time; and operating, by the one or more computing devices, the vehicle based on the revised first driving solution.

The method may further comprise revising, by the one or more computing devices, the second driving solution so that the revised second driving solution has a segment prior to the switching time that is identical to a segment of the revised first driving solution prior to the switching time.

The first segment of the second driving solution may be determined further based on an internal constraint having a global discomfort level of the first driving solution for a passenger in the vehicle and other road users detected in the vehicle's environment, and wherein the second segment of the second driving solution may be determined based on an internal constraint having an elevated discomfort level higher than the global discomfort level.

The switching time may be a time at which a confidence level that the agent is following either the first trajectory or the second trajectory meets a confidence threshold. The confidence level may be determined based on a comparison between a predicted state of the agent if the agent is following the first trajectory and a predicted state of the agent if the agent is following the second trajectory. The predicted state may be a predicted position of the agent. The predicted state may be a predicted velocity of the agent.

The mismatch may include a position mismatch between the first segment of the second driving solution and the segment of the first driving solution prior to the switching time. The mismatch may include a velocity mismatch between the first segment of the second driving solution and the segment of the first driving solution prior to the switching time.

DETAILED DESCRIPTION

Overview

Figure 1:
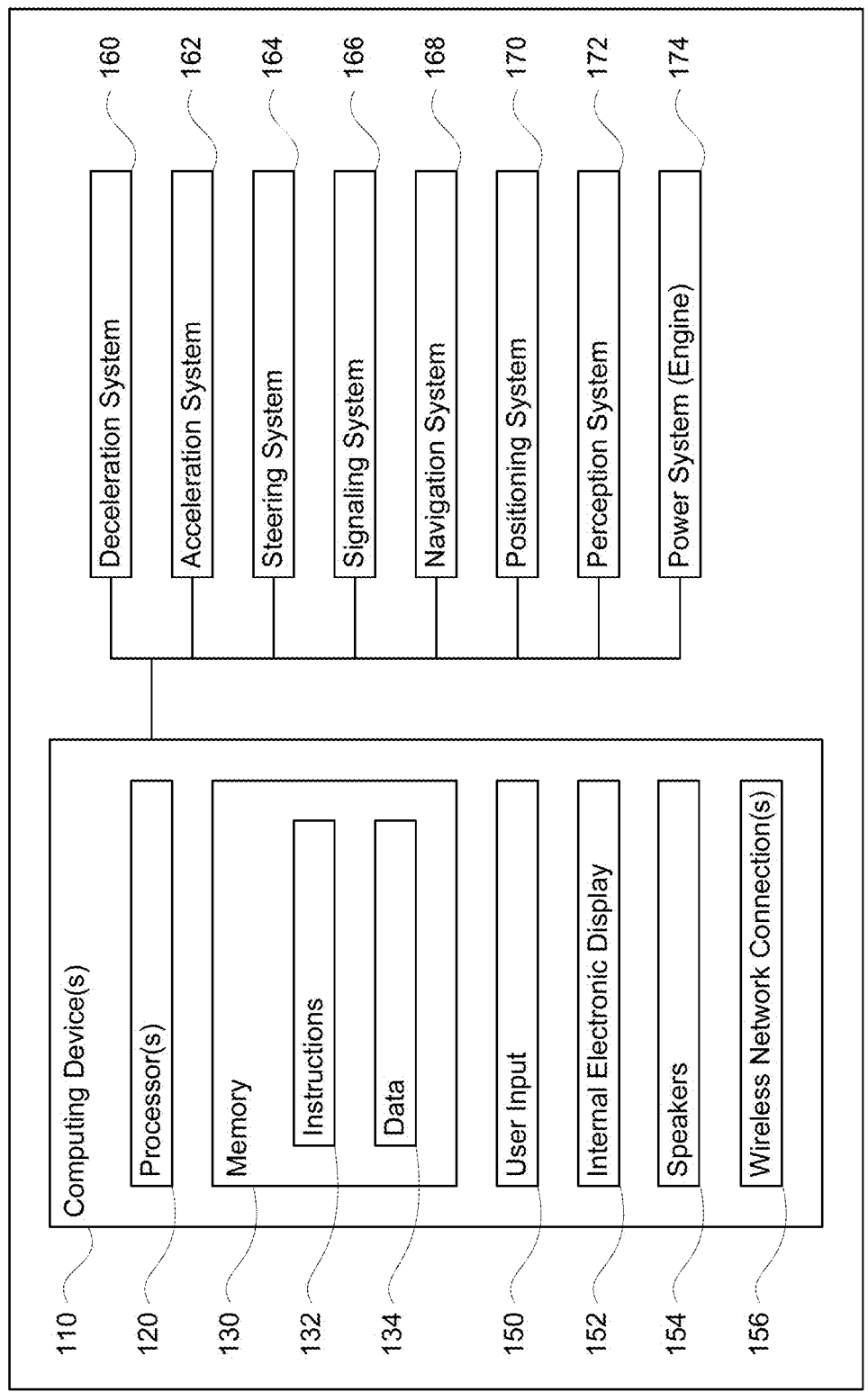
FIG. 1 is a functional diagram of an example vehicle in accordance with aspects of the disclosure.

The technology relates to planning a plurality of driving solutions for a given portion of a route for an autonomous vehicle based on one or more constraints. As the vehicle is navigated along a route, the vehicle's computing devices have to plan a driving solution for a given portions of the route in response to other agents on the road. In this regard, one or more sensors of the vehicle may detect these other agents and their characteristics (position, shape, heading, speed, etc.). Based on the detected characteristics, the vehicle's computing devices may predict possible trajectories for the detected agents. A trajectory may define what a detected agent is likely to do for some brief period into the future, such as the period during which the vehicle is driving through the given portion of the route. Based on the predicted trajectories, the vehicle's computing devices may determine a driving solution in order to avoid hitting the detected agents. However, when a detected agent is predicted to have a plurality of possible trajectories, the vehicle's computing devices may have to plan the driving solution based on more than one possible trajectory of the detected agent.

In this regard, when a detected agent is predicted to have a plurality of possible trajectories, the vehicle's computing devices may determine a first driving solution based on the detected agent following a first trajectory. This first trajectory may be a trajectory that yields or cooperates with the vehicle's next intended maneuver. The vehicle's computing devices may then determine a switching time for the vehicle to switch, if needed, from the first driving solution to another driving solution in case if the agent follows a second trajectory. This second trajectory may be a trajectory that passes or does not cooperate with the vehicle's next intended maneuver. The vehicle's computing devices may revise the first driving solution so that switching from the revised first driving solution to another driving solution at the switching time is possible. The computing devices of the vehicle may then control the vehicle to operate according to the revised first driving solution.

The first driving solution may be determined for the vehicle along a portion of a route based on current driving settings, traffic control features on the route, and one or more constraints. Traffic control features may include features, characteristics, or objects on or near a roadway that provides indications for directing traffic, such as lane lines, signs, traffic lights, etc. The one or more constraints may include an external constraint having a first value, where the first value correspond to an agent detected in the vehicle's environment following a first trajectory, such as a cooperating trajectory. In addition, the one or more constraints may include an internal constraint, such as a global discomfort level for a passenger of the vehicle and other road users.

The switching time may be determined based on finding a time in the future at which a confidence level that the detected agent is following either the first trajectory or the second trajectory meets a confidence threshold. For example, the confidence level may be determined based on a comparison between a predicted state of the agent if the agent is following the first trajectory and a predicted state of the agent if the agent is following the second trajectory.

In one example approach for revising the first driving solution, a switching constraint may be determined for the switching time. The switching constraint for the switching time may be determined based on the detected agent following a second trajectory, such as a passing or non-cooperating trajectory, and based on an elevated discomfort level higher than the global discomfort level. The switching constraint may be formulated such that, if the revised first driving solution satisfies the switching constraint, the vehicle will be able to switch to a second driving solution that avoids collision with the non-cooperating agent. The first driving solution may then be revised based on the switching constraint for the switching time.

In another example approach for revising the first driving solution, a second driving solution may be determined based on the detected agent following the second trajectory, such as a passing or non-cooperating trajectory, and based on an elevated discomfort level. The first driving solution may be revised based on the second driving solution. For example, the revised first driving solution may have a segment prior to the switching time that is identical to a segment of the second driving solution prior to the switching time. Additionally or alternatively, the second driving solution may be revised so that the revised second driving solution has a segment prior to the switching time that is identical to a segment of the revised first driving solution before the switching time.

Once the revised first driving solution is found, the vehicle's computing devices may operate the vehicle based on the revised first driving solution. While performing the revised first driving solution, the vehicle's computing devices may determine to switch to another driving solution before or at the switching time, for example based on a determination that the detected agent is following the non-cooperating trajectory.

The features described above may allow for an autonomous vehicle to be able to hedge against unlikely-but-potentially-high-severity collisions by ensuring that the vehicle will have the ability to switch to an alternative trajectory if needed. This alternative trajectory determined as described above may still provide as comfortable a ride as possible for a passenger of the vehicle. The autonomous vehicle is able to proceed along a route safely without having to slow or stop as frequently to account for the uncertain behavior of other agents on the road.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 30 to 60 degrees offset from a current path of the vehicle." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own CPU or other processor, memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. In addition to internal speakers, the one or more speakers 154 may include external speakers that are arranged at various locations on the vehicle in order to provide audible notifications to objects external to the vehicle 100. The one or more computing device 110 of vehicle 100 may also receive or transfer information to and from other computing devices, for instance using wireless network connections 156.

In one example, computing device 110 may be an autonomous driving computing system incorporated into vehicle 100. The autonomous driving computing system may be capable of communicating with various components of the vehicle. For example, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The computing device 110 may control the direction and speed of the vehicle by controlling various components. By way of example, computing device 110 may navigate the vehicle to a destination location completely autonomously using data from the map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing device 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store map information, e.g., highly detailed maps that computing device 110 can use to navigate or control the vehicle. As an example, these maps may identify the shape and elevation of roadways, lane markers, intersections, crosswalks, speed limits, traffic signal lights, buildings, signs, real time or historical traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line. As noted above, the map information may store known traffic or congestion information and/or and transit schedules (train, bus, etc.) from a particular pickup location at similar times in the past. This information may even be updated in real time by information received by the computing device 110.

Figure 2:
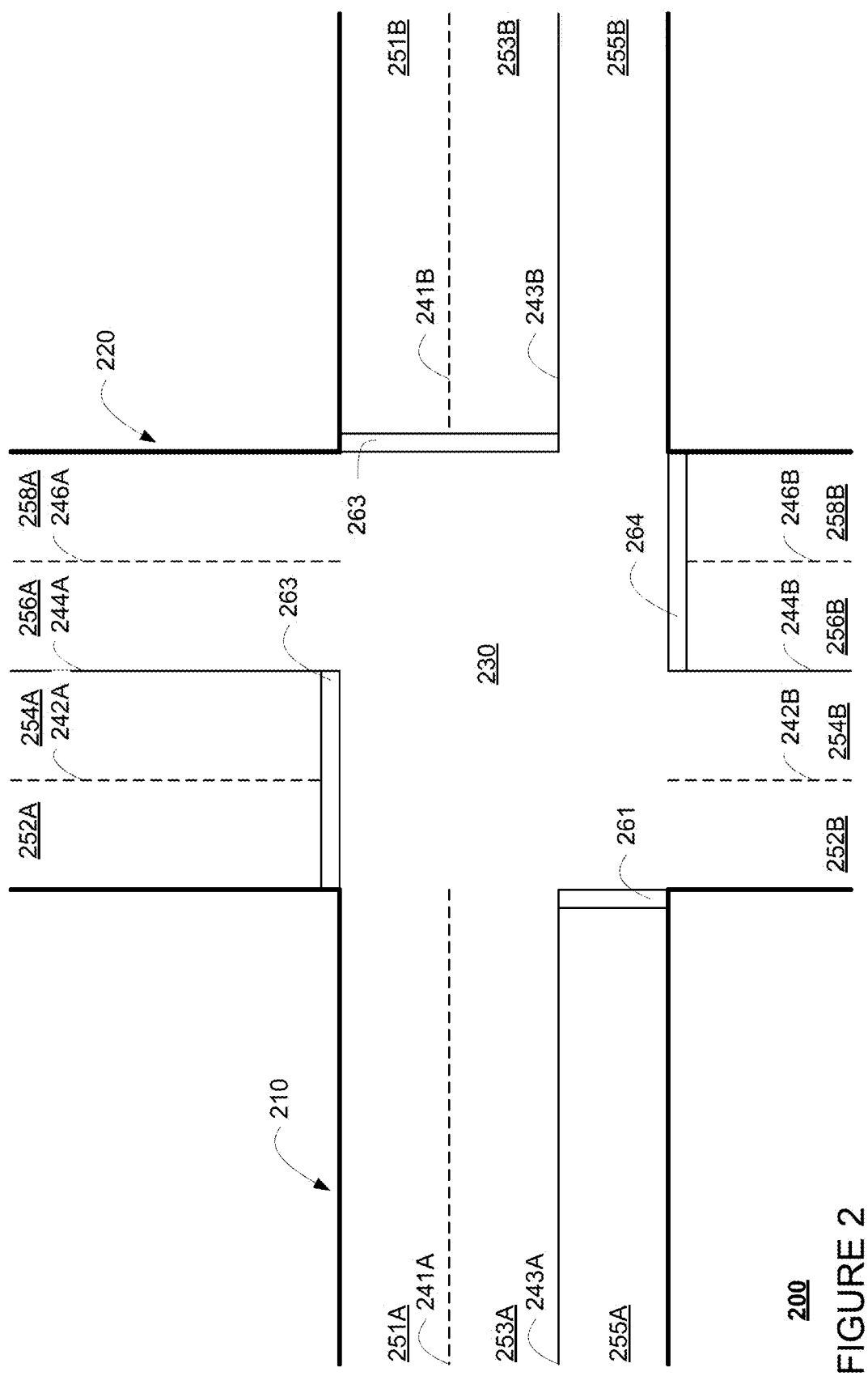
FIG. 2 is an example map information in accordance with aspects of the disclosure.

FIG. 2 is an example of map information 200 for a section of roadway including intersection 230. In this example, map information 200 depicts a portion of the map information that includes information identifying the shape, location, and other characteristics of various features. For example, map information 200 includes road 210 and road 220 intersecting at intersection 230. Map information 200 includes lane markers or lane lines 241A and 243A of road 210 on one side of intersection 230, lane lines 241B and 243B of road 210 on the other side of intersection 230, lane lines 242A, 244A, and 246A of road 220 on one side of intersection 230, and lane lines 242B, 244B, and 246B of road 220 on the other side of intersection 230. The lane lines may also define various lanes, such as lanes 251A, 253A, and 255A of road 210 on one side of intersection 230, lanes 251B, 253B, and 255B of road 210 on the other side of intersection 230, lanes 252A, 254A, 256A, and 258A of road 220 on one side of intersection 230, and lanes 252B, 254B, 256B, and 258B of road 220 on the other side of intersection 230. The lanes may be explicitly identified in the map information 200 as shown, or may be implied by the width of a road. Map information 200 may also identify bicycle lanes. As shown, map information 200 may also include stop lines 261 and 263 for road 210, and stop lines 262 and 264 for road 220.

In addition to these features, the map information 200 may also include information that identifies the direction of traffic and speed limits for each lane as well as information that allows the computing device 110 to determine whether the vehicle has the right of way to complete a particular maneuver (e.g., to complete a turn or cross a lane of traffic or intersection). Map information 200 may further include information on traffic signs, such as traffic lights, stop signs, one-way sign, no-turn sign, etc. Map information 200 may include information about other environmental features such as curbs, buildings, parking lots, driveways, waterways, vegetation, etc.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing device 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent for further processing to the computing device 110 periodically and continuously as it is generated by the perception system 172. As discussed in further detail below, computing device 110 may use the positioning system 170 to determine the vehicle's location and perception system 172 to detect and respond to objects when needed to reach the location safely.

Figure 3:
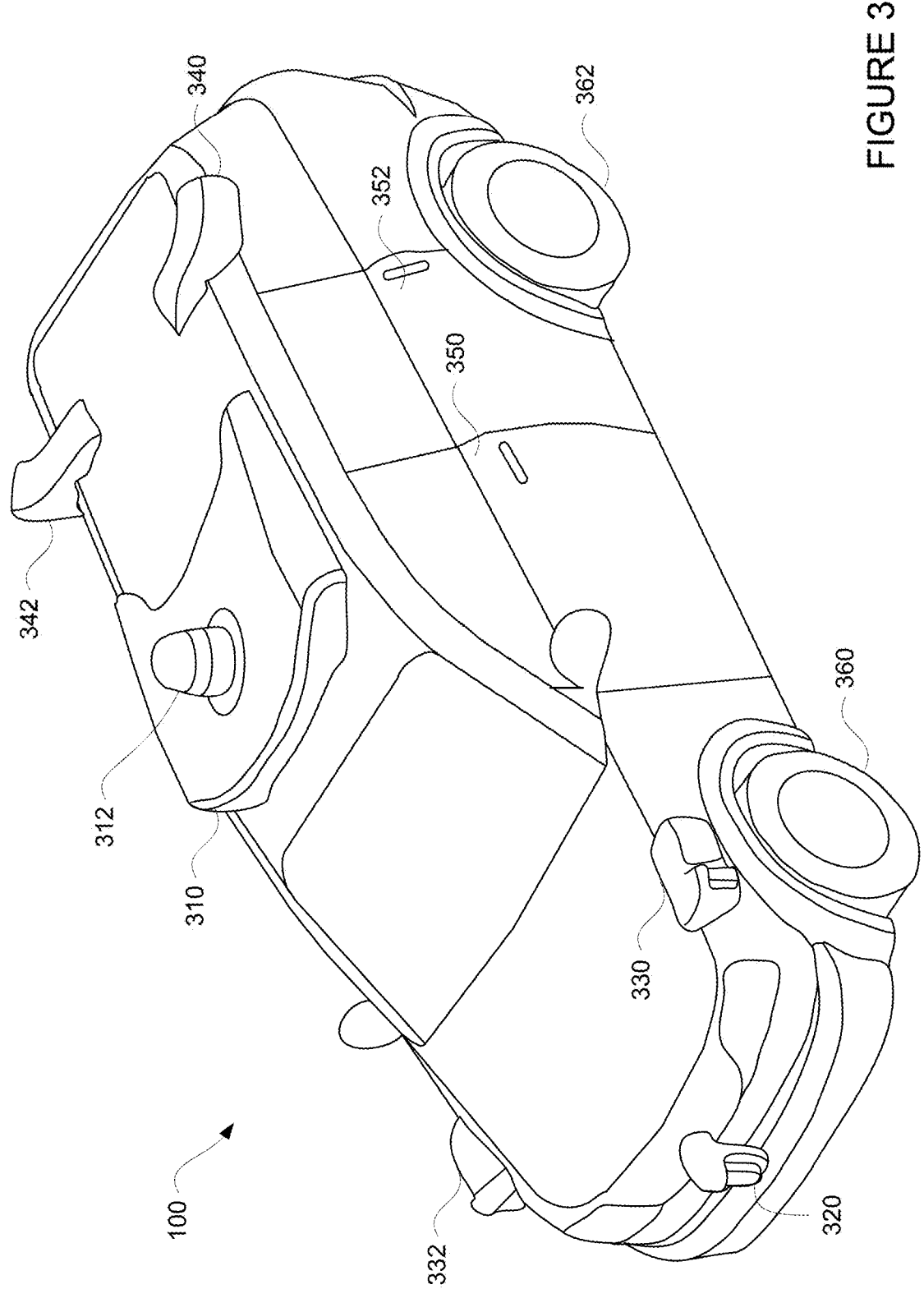
FIG. 3 is an example external view of a vehicle in accordance with aspects of the disclosure.

FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

Once a nearby object is detected, computing device 110 and/or perception system 172 may determine the object's type, for example, a traffic cone, pedestrian, a vehicle (such as a passenger car, truck, bus, etc.), bicycle, etc. Objects may be identified by various models which may consider various characteristics of the detected objects, such as the size of an object, the speed of the object (bicycles do not tend to go faster than 40 miles per hour or slower than 0.1 miles per hour), the heat coming from the bicycle (bicycles tend to have rider that emit heat from their bodies), etc. In addition, the object may be classified based on specific attributes of the object, such as information contained on a license plate, bumper sticker, or logos that appear on the vehicle.

Memory 130 may store various models used by computing device 110 to make determinations on how to control vehicle 100. For example, memory 130 may store one or more object recognition models for identifying road users and objects detected from sensor data. For another example, memory 130 may store one or more behavior models for providing the probability of one or more actions being taken a detected object. For another example, memory 130 may store one or more speed planning models for determining speed profiles for vehicle 100 based on map information 200 from navigation system 168 and predicted trajectories of other road users detected by sensor data from perception system 172.

Figure 4:
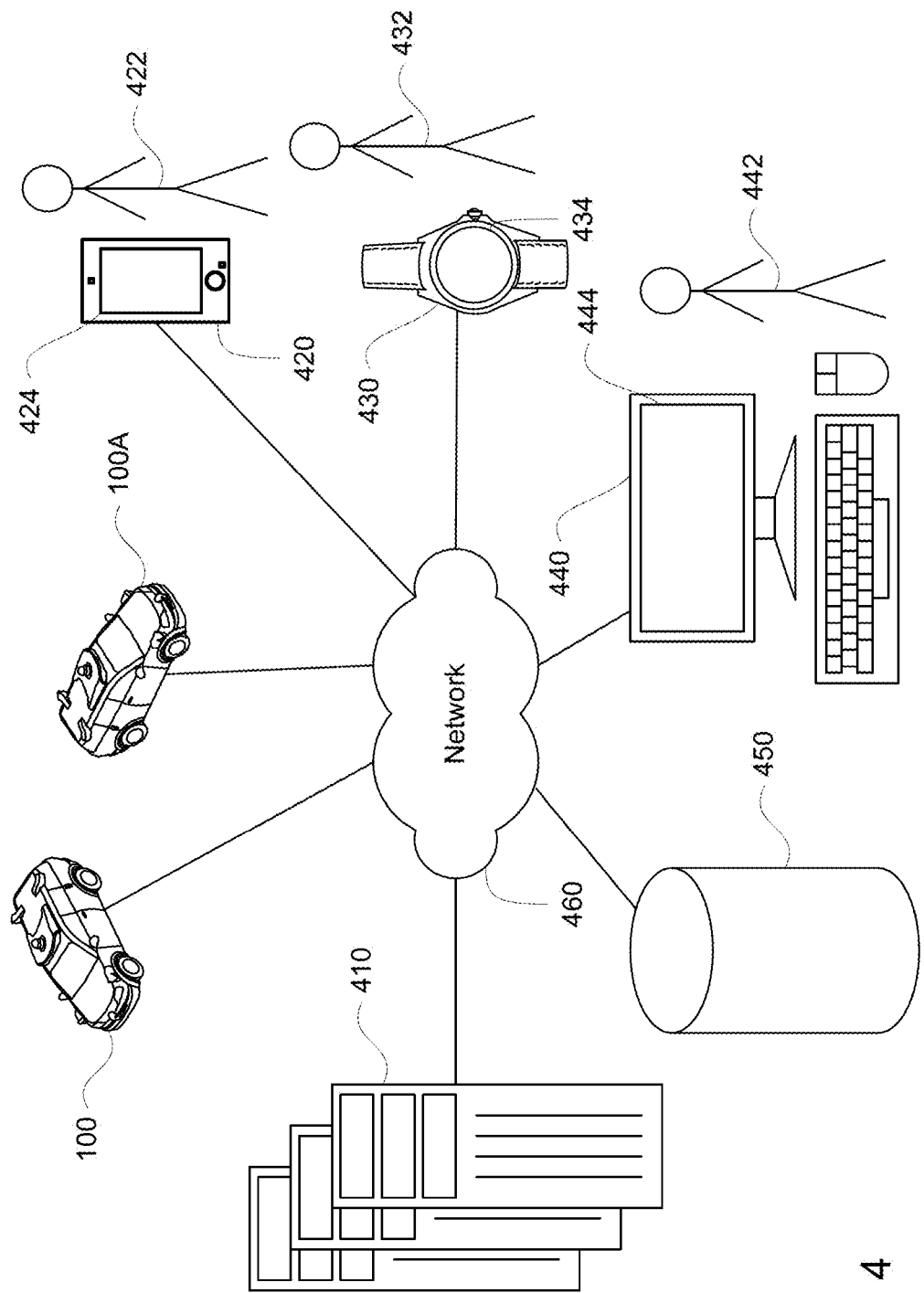
FIG. 4 is an example pictorial diagram of a system in accordance with aspects of the disclosure.
Figure 5:
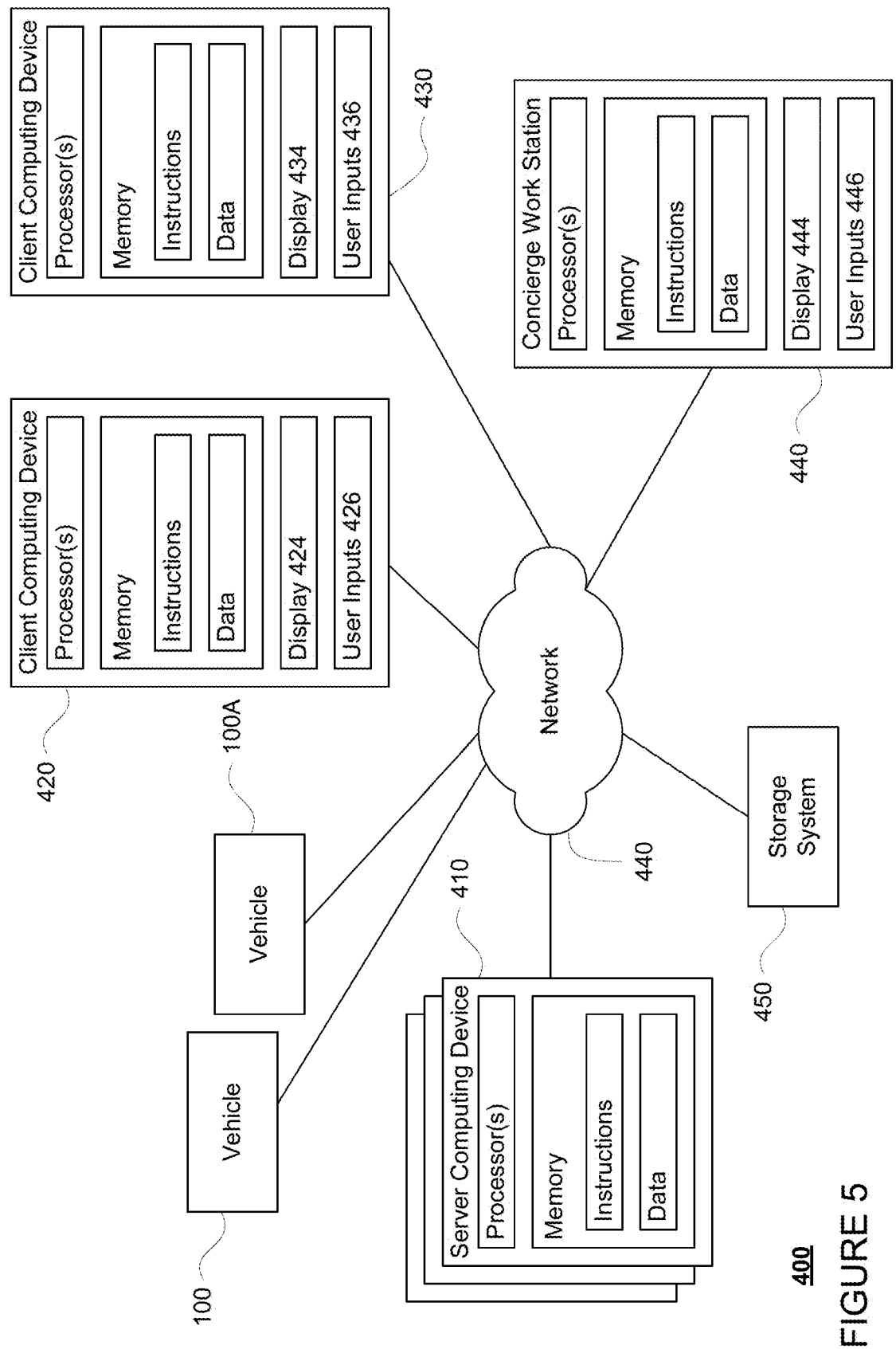
FIG. 5 is an example functional diagram of a system in accordance with aspects of the disclosure.

FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as BLUETOOTH®, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing device 110 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with one or more computing device 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a CPU), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wrist watch in FIG. 4. As an example the user may input information using a small keyboard, a keypad, microphone, using visual signals with a camera, or a touch screen.

In some examples, client computing device 440 may be remote operator work station used by an administrator to provide remote operator services to users such as users 422 and 432. For example, a remote operator 442 may use the remote operator work station 440 to communicate via a telephone call or audio connection with users through their respective client computing devices and/or vehicles 100 or 100A in order to ensure the safe operation of vehicles 100 and 100A and the safety of the users as described in further detail below. Although only a single remote operator work station 440 is shown in FIGS. 4 and 5, any number of such work stations may be included in a typical system.

Storage system 450 may store various types of information as described in more detail below. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as age information, health information, and user history information about how long it has taken the user to enter or exit vehicles in the past as discussed below.

The storage system 450 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc. The storage system 450 may further store map information, such as map information 200.

The storage system 450 may also store various models for routing and controlling vehicle 100, such as object recognition models, behavior models, speed planning models, etc. In this regard, the storage system 450 may store data used for training some or all of these models. For example, training data may include images manually labeled with identified objects, videos of trajectories taken by road users in various traffic patterns. The storage system 450 may store other data required for using these models, such as parameters and values.

The storage system 450 may also store information which can be provided to client computing devices for display to a user. For instance, the storage system 450 may store predetermined distance information for determining an area at which a vehicle is likely to stop for a given pickup or destination location. The storage system 450 may also store graphics, icons, and other items which may be displayed to a user as discussed below.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing device 110, 410, 420, 430, 440, etc.

Example Methods

In addition to the systems described above and illustrated in the figures, various operations will now be described. It should be understood that the following operations do not have to be performed in the precise order described below. Rather, various steps can be handled in a different order or simultaneously, and steps may also be added or omitted.

Figure 6A:
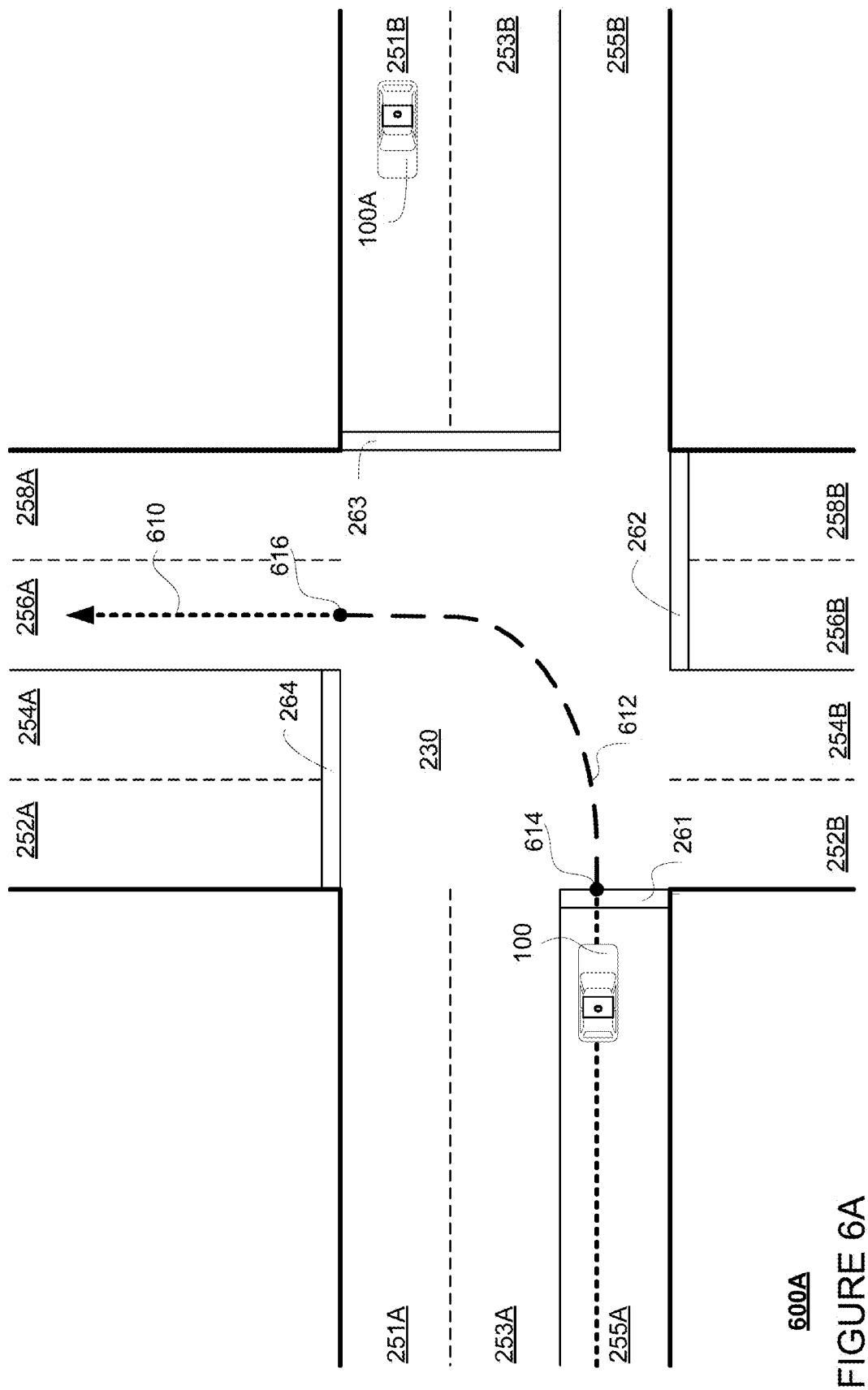
FIG. 6A-7 are examples of various situations in accordance with aspects of the disclosure.
Figure 6B:
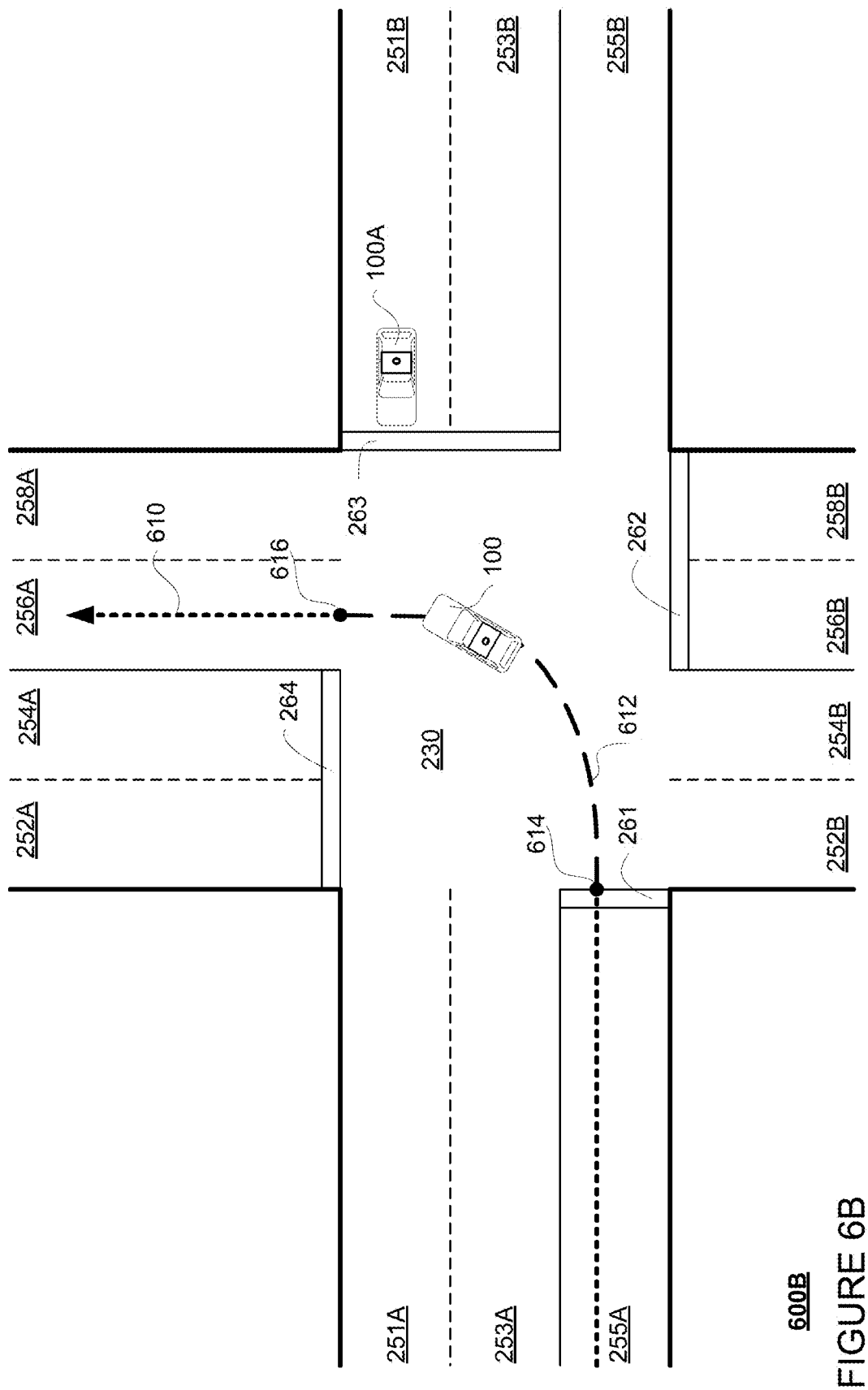
Figure 6C:
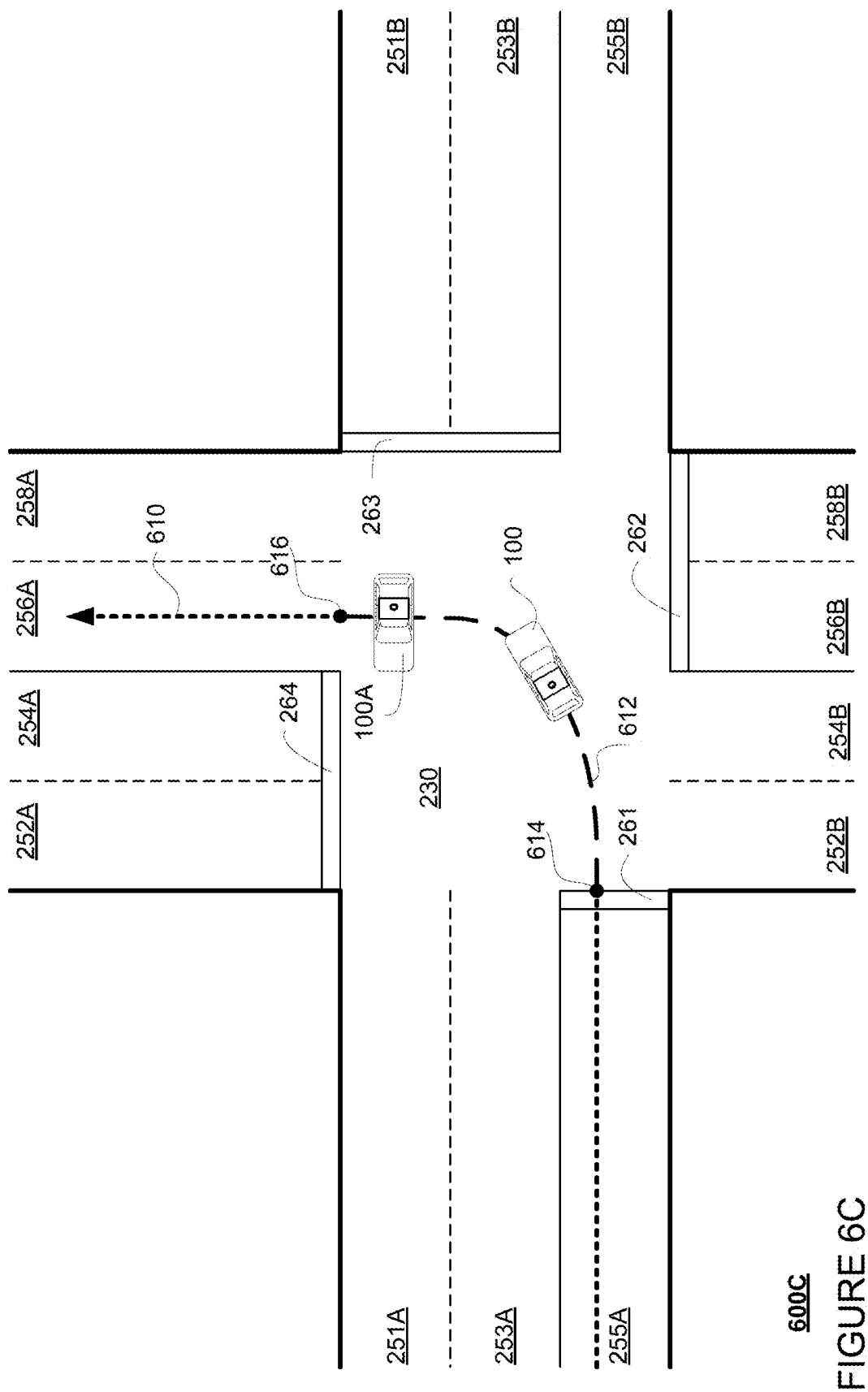

The computing device 110 may maneuver vehicle 100 towards a destination location. In order to do so, computing device 110 may calculate a route based on map information 200 from navigation system 168. Computing device 110 may control vehicle 100 to follow the calculated route. While following the route, computing device 110 may detect various agents in its environment, such as road users and other objects, from sensor data from perception system 172, and predict their behaviors. For example, the behaviors may include possible trajectories of the detected agents, which may be predicted based on sensor data and map information, as illustrated by FIGS. 6A-C and discussed in detail below. Based on these predicted trajectories, computing device 110 may determine driving solutions for vehicle 100 to safely respond to these detected agents.

FIGS. 6A-C show example snapshots 600A-600C to illustrate example situations for a portion of the route followed by vehicle 100. For example, FIG. 6B may be a snapshot taken after a time interval has lapsed since the snapshot taken in FIG. 6A for one alternative scenario, and FIG. 6C may be a snapshot taken after a time interval has lapsed since the snapshot taken in FIG. 6A for another alternative scenario. Various features in FIGS. 6A-C may generally correspond to the shape, location, and other characteristics of features shown in map information 200 of FIG. 2, and labeled as such. Additional features in FIGS. 6A-C, including various agents such as road users and other objects, are described in detail below. Although these examples are useful for demonstration purposes, they should not be considered limiting.

Referring to FIG. 6A, vehicle 100 is shown following a route 610 (indicated by dotted arrow), where a next portion 612 starting at start point 614 and ending at end point 616 (dashed portion of the arrow) of route 610 is a left turn at intersection 230. As vehicle 100 approaches intersection 230 in lane 255A, computing device 110 may determine a driving solution for portion 612. A driving solution for portion 612 may include details on how vehicle 100 should perform the left turn. For example, a driving solution may include a navigational path, a speed profile, an acceleration profile, a jerk profile, a separation distance from other road users or objects, etc.

Computing device 110 may determine a driving solution along portion 612 based on current driving settings, traffic control features, and one or more constraints, each of which will be described in turn below. With respect to the one or more constraints, these one or more constraints may be external or internal. For example, external constraints may include trajectories of agents detected from sensor data, such as vehicles, pedestrians, while internal constraints may include a maximum discomfort level for passenger in vehicle 100 or a global discomfort level for vehicle 100 and other agents reacting to vehicle 100. A trajectory may define what a detected agent is likely to do for some brief period into the future, such as the period during which the vehicle is driving through the given portion of the route. A trajectory may include, for example, a position profile, a speed profile, an acceleration profile, a jerk profile, etc.

With respect to trajectories of detected agents, computing device 110 may make predictions based on sensor data indicating speed, direction, position, heading, traffic conditions, as well as interactions between the various agents and/or vehicle 100. Referring to FIG. 6A, sensor data may indicate that vehicle 100A in lane 251B is about 50 m away from intersection 230, and is driving at 40 km/hr in a straight line headed towards intersection 230 without a turn signal on. Further, sensor data may indicate that traffic light for road 210 just turned yellow, and map information 200 may indicate that duration for yellow light at intersection 230 is 4 s. Still further, sensor data may indicate that vehicle 100 is in lane 255A about 10 m away from stop line 261 and has its left-turn signal on, which is in a field of view of vehicle 100A. As such, computing device 110 may determine that, at its current speed, vehicle 100A can barely reach stop line 263 before the light turns red, and sees a left-turning vehicle 100, thus one potential trajectory for vehicle 100A is to slow down and stop at stop line 263, as shown in FIG. 6B. Since the trajectory of vehicle 100A shown in FIG. 6B yields to or cooperates with the left turn maneuver intended by vehicle 100, thus the trajectory of vehicle 100A in FIG. 6B may be referred to as a "yielding trajectory" or a "cooperating trajectory," and vehicle 100A in this case may be referred to as a "cooperating agent." Although in the example shown in FIG. 6B, the yielding or cooperating trajectory of vehicle 100A is shown as including a complete stop, in other examples, other types of trajectories may also be considered as yielding or cooperating. For example, in lane change or lane merge situations, a slight deceleration or merely not accelerating may be considered a yielding or cooperating trajectory.

However, computing device 110 may also determine that another potential trajectory for vehicle 100A may be to drive through intersection 230 at its current speed, as shown in FIG. 6C. Since the trajectory of vehicle 100A shown in FIG. 6C passes vehicle 100 before or during the left turn maneuver intended by vehicle 100, the trajectory of vehicle 100A in FIG. 6C may be referred to as a "passing trajectory" or a "non-cooperating trajectory," and vehicle 100A in this case may be referred to as a "non-cooperating agent."

When multiple potential trajectories are predicted for a detected agent, computing device 110 may determine a first driving solution based on the detected agent following the cooperating trajectory. As mentioned above, driving solutions may be determined based on current driving settings, traffic control features, and one or more constraints. With respect to external constraints, the first driving solution may be determined based on the yielding or cooperating trajectory of vehicle 100A, as shown in FIG. 6B. In other examples, if multiple agents are detected in the environment of vehicle 100, a first driving solution may be determined based on all agents following cooperating trajectories. With respect to internal constraints, computing device 110 may set a maximum discomfort level allowed for performing the first driving solution. In some examples, computing device 110 may determine the first driving solution by finding a candidate solution with the minimal discomfort level.

In this regard, a discomfort level for a driving solution may be determined based on a number of factors. For example, a discomfort level may be determined based on quantities such as acceleration, jerk, clearance distance, etc. For example, an acceleration above an acceleration threshold may be assigned a first discomfort value. A jerk beyond a jerk threshold may be assigned a second discomfort value. A lateral acceleration above a lateral acceleration threshold may be assigned a third discomfort value. And being within a minimal separation threshold from other road users or objects may be assigned a fourth discomfort value, etc. For example, each factor described above may have a discomfort value for a particular candidate driving solution, and computing device 110 may take the maximum value among these factors to obtain a discomfort level discomfort_self for vehicle 100 for the particular candidate driving solution. In some examples, computing device 110 may select the candidate driving solution with the lowest discomfort_self as the first driving solution.

In some examples, computing device 110 may determine a global discomfort level for vehicle 100 as well as for other agents affected by vehicle 100 performing a candidate driving solution, and select the candidate driving solution with the lowest global discomfort level as the first driving solution. For example, computing device 110 may assign a discomfort value for vehicle 100 decelerating beyond a deceleration threshold before entering intersection 230, another discomfort value for vehicle 100A having to yield to vehicle 100, and another discomfort value for another vehicle behind vehicle 100 also having to decelerate beyond the deceleration threshold. Computing device 110 may combine the maximum value for vehicle 100 and maximum values for other road users affected to obtain a global discomfort level discomfort_global.

Computing device 110 may determine the first driving solution further based on current driving settings, such as the current speed, acceleration, direction, and heading of the vehicle. For example, computing device 110 may determine that vehicle 100 is driving at 40 km/hr in a straight line in lane 255A towards intersection 230, and is 10 m way from stop line 261, and may determine that the first driving solution requires slowing down to 20 km/hr while turning along portion 612.

Computing device 110 may determine the first driving solution further based on traffic control features, which may include features, characteristics, or objects on or near a roadway that provides indications for directing traffic, such as lane lines, signs, traffic lights, speed limits, etc. For example, computing device 110 may determine that the first driving solution include turning from lane 255A into lane 256A, instead for example turning into lane 254A. For another example, computing device 110 may determine that the left turn is performed during yellow light, and thus, once entered into intersection 230, vehicle 100 must complete the left turn even if the traffic light turns red during the turn.

In some examples, a speed planning model may be used for determining a speed profile for a driving solution. For example, the speed planning model may generate a speed profile with a speed value for each predetermined time increment. Such a speed planning model may be trained using map information from navigation system 168 and sensor data generated by perception system 172 for speed profiles used for various maneuvers performed on different roads with different traffic patterns. The training data may be labeled with discomfort levels, for example the labels may be manually generated by a remote operator. The sensor data may include all of the data generated by the perception system 172 before and during a maneuver, or more streamlined information, such as dimensions and shapes of the road on which a maneuver is performed, the pose, velocity, acceleration and similar data for other road users also on the road where the maneuver is performed. The behavior models may include machine learning models, such as a deep neural network.

Figure 7:
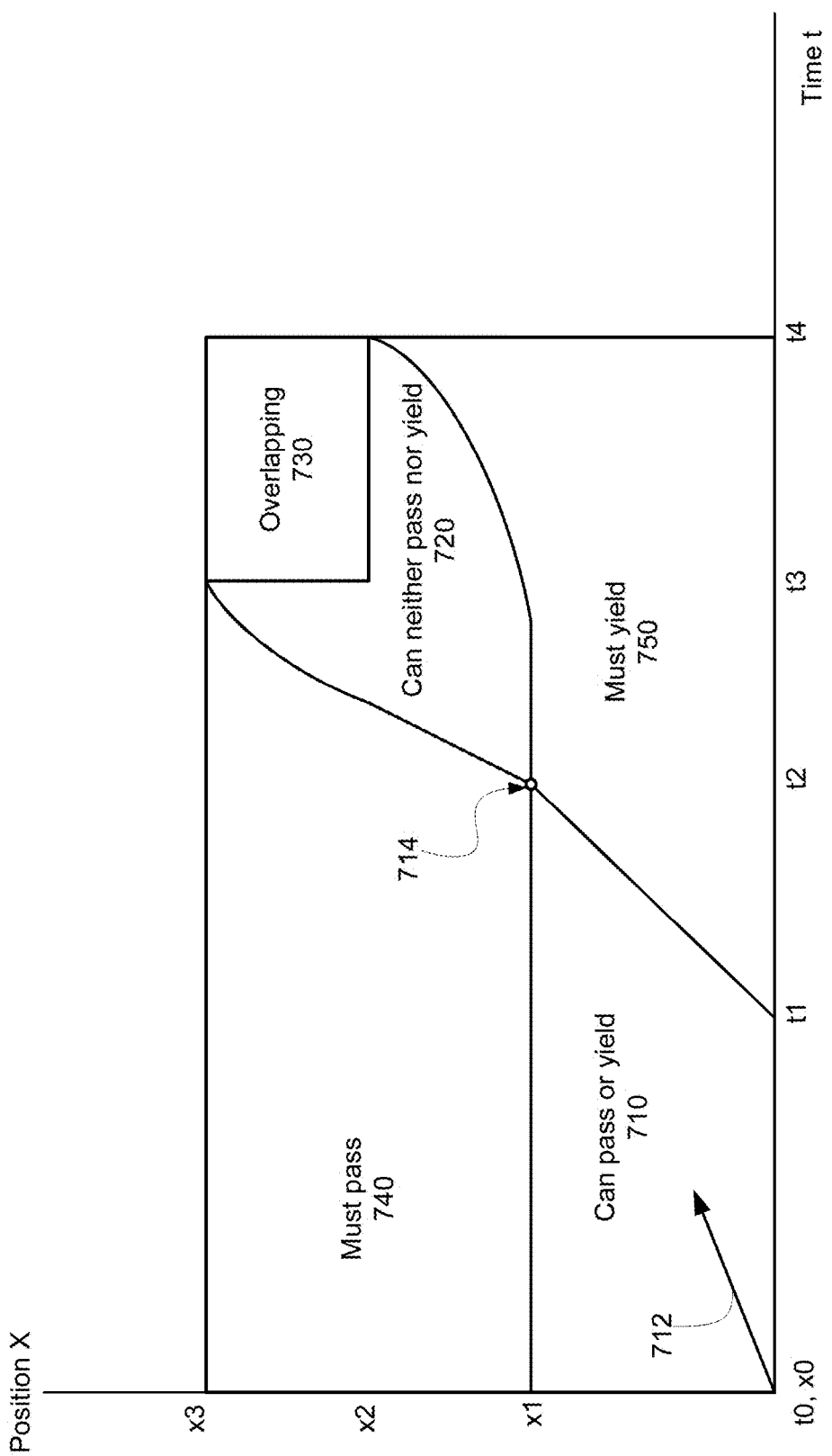

However, in case vehicle 100A performs the passing or non-cooperating trajectory while vehicle 100 is following the first driving solution, vehicle 100 may need to react by deviating from the first driving solution, which may be dangerous. FIG. 7 shows an example graphical representation 700 of example scenarios when reacting to a non-cooperating agent while following a driving solution determined based on an assumption that the agent will follow a cooperating trajectory. As shown, representation 700 is a position-time graph divided into zones 710, 720, 730, 740, and 750. For example, these zones may illustrate different scenarios encountered by vehicle 100 at intersection 230 of FIGS. 6A and C, where vehicle 100 may have been following the first driving route expecting a cooperating vehicle 100A, but instead encounters a non-cooperating vehicle 100A while performing the first driving solution. Although these examples are useful for demonstration purposes, they should not be considered limiting.

As shown, initially at position x0 and time t0, vehicle 100 is driving at a current speed 712. For example, speed 712 may be the initial speed of the first driving solution at the beginning of portion 612. At this moment, vehicle 100 is in a "can pass or yield" zone 710. This means that, if vehicle 100 detects that vehicle 100A is actually on a non-cooperating trajectory (instead of the cooperating trajectory that the first driving solution was based on), while in zone 710, vehicle 100 may have the option to pass the non-cooperating vehicle 100A by speeding up, or to yield to non-cooperating vehicle 100A by slowing down.

If, however, vehicle 100 does not detect or does not react to the non-cooperating trajectory of vehicle 100A while in zone 710, vehicle 100 may continue to follow the first driving solution at speed 712, and reaches point 714 at position x1 and time t2. At this point, vehicle 100 enters "can neither pass nor yield" zone 720. While in zone 720, vehicle 100 is too fast and/or have traveled too far to be able to slow down in time to yield to vehicle 100A, yet too slow and/or have waited too long to be able to speed up and pass vehicle 100A. Therefore, vehicle 100 continues into "overlapping" zone 730, where a collision with non-cooperating vehicle 100A is likely if not inevitable. To illustrate, referring back to FIG. 6C, the overlapping zone 730 may include the segment of portion 612 where both vehicle 100 and vehicle 100A need to reach in order to perform their respective trajectories. In the overlapping zone 730, because both vehicles 100 and 100A are between position x2 and position x3 at some time between time t3 and time t4, a collision is likely if not inevitable. Since being at point 714 results in a likely or inevitable collision, point 714 may be considered a "point of no return."

Consider another scenario where, while in zone 710, vehicle 100 detects and reacts to non-cooperating vehicle 100A by speeding prior to reach position x1 before time t2, vehicle 100 then enters into a "must pass" zone 740. Once in zone 740, vehicle 100 is too fast and/or have traveled too far to be able to slow down in time to yield to non-cooperating vehicle 100A. Therefore, beyond this point, vehicle 100 must pass non-cooperating vehicle 100A to avoid collision.

Consider still another scenario where, while in zone 710, vehicle 100 detects and reacts to non-cooperating vehicle 100A by slowing down such that vehicle 100 does not reach position x1 by time t2, vehicle 100 then enters into a "must yield" zone 750. In zone 750, vehicle 100 is too slow and/or have waited too long to be able to speed up and pass non-cooperating vehicle 100A. Therefore, beyond this point, vehicle 100 must yield to non-cooperating vehicle 100A to avoid collision.

As illustrated by these example scenarios, reacting to non-cooperating agents spontaneously while following a driving solution determined based on assuming cooperating agents may be dangerous. As such, computing device 110 may revise the first driving solution so that vehicle 100 may switch from the revised first driving solution to another driving solution in case if the assumption of cooperating agents was wrong. This way, vehicle 100 can mitigate the risk of reaching the point of no return. For example as illustrated in FIG. 7, while still in the "can pass or yield" zone 710, vehicle 100 may switch from the first driving solution to another driving solution either in the "must pass" zone 740 or the "must yield" zone 750. In other words, vehicle 100 must make the switch from the first driving solution to another driving solution before the "switching point" time t2. Further as illustrated in FIG. 7, the first driving solution may be revised so as to increase the duration of the "can pass or yield" zone 710. For example, if the first driving solution had a slower initial speed, the "switching point" may come later, as such, vehicle 100 may have more time to both detect whether vehicle 100A is non-cooperating and to react to the non-cooperating trajectory.

Figure 8:
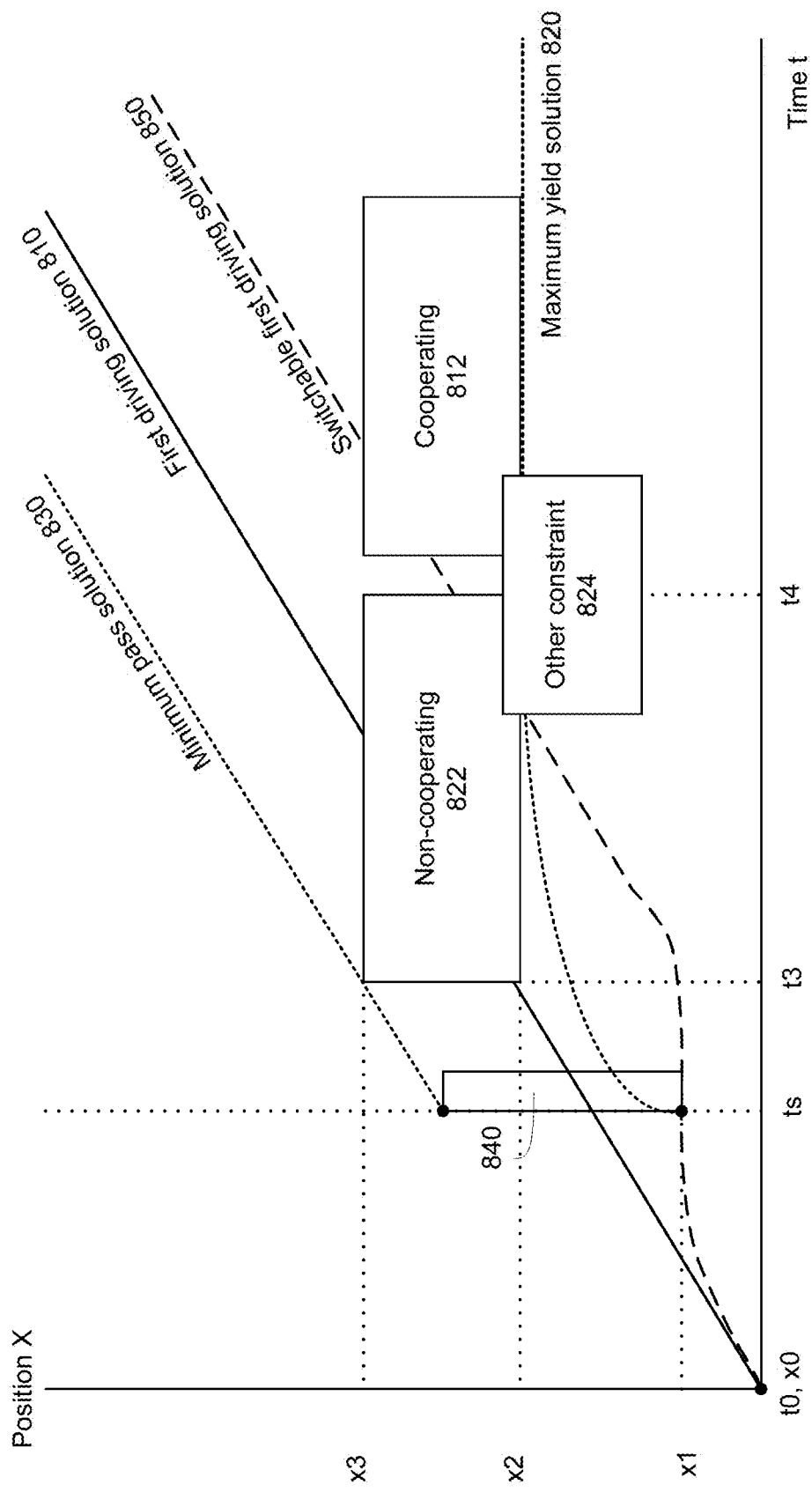
FIG. 8 is an example graphical representation of various driving solutions determined based on an example method.

In order to address the problems illustrated in FIG. 7, FIG. 8 shows an example graphical representation 800 of an example approach, for revising the first driving solution. For instance, a switching constraint at the switching time is determined, and the first driving solution is revised based on the switching constraint so that the vehicle may switch from the revised first driving solution to another driving solution at the switching time. As shown, representation 800 is a position-time graph with various external constraint values and speed profiles. For example, driving solutions 810 and 850 may be possible speed profiles for vehicle 100 for portion 612, where vehicle 100A is identified as having alternative trajectories as shown in FIGS. 6B and 6C. Although these examples are useful for demonstration purposes, they should not be considered limiting.

As shown, first driving solution 810 may be determined based on current driving settings, traffic control features, and one or more constraints, as described above. As shown, the first driving solution 810 starts at time to and position x0, which for example may correspond to the time when vehicle 100 will be at start point 614 of portion 612 shown in FIG. 6B. The external constraint may include a "cooperating" constraint 812. For instance, the cooperating constraint 812 may correspond to vehicle 100A performing the cooperating trajectory shown in FIG. 6B. The internal constraint may include a global discomfort level.

Next, a switching time may be determined for switching from the first driving solution to another driving solution, if needed, for example in case if vehicle 100A follows a second trajectory, such as the non-cooperating trajectory of FIG. 6C. For instance, the switching time may be determined based on a confidence level that the agent is either on a cooperating or a non-cooperating trajectory beyond a threshold confidence level. For example, computing device 110 may determine a probability distribution for a position of the agent at a number of time points during a time period. Based on these probability distributions, computing device 110 may determine a switching time at which it can be determined with 95% confidence that the agent is cooperating or non-cooperating. Computing device 110 may further determine the switching time based on probability distributions for other states of the agent, such as velocity, acceleration, etc.

Additionally or alternatively, the confidence level may be based on a difference between a predicted state of the agent had the agent been on a cooperating trajectory and a predicted state of the agent had the agent been on a non-cooperating trajectory. The predicted states of the agent may include position, velocity, acceleration, etc., of the agent. Referring back to FIGS. 6B and 6C, for example, computing device 110 may determine that, at time ts, the predicted velocity of vehicle 100A is v_a if vehicle 100A had been on a cooperating trajectory (e.g., 5 km/hr to slow down before stop line 263), but the predicted velocity of vehicle 100A is v_b if vehicle 100A had been on a cooperating trajectory (e.g., 40 km/hr to speed passed stop line 263). Computing device 110 may further determine that the difference between v_a and v_b is greater than a threshold velocity difference, which corresponds to a 90% confidence level.

As mentioned above, at the switching time ts, vehicle 100 may need to switch from the first driving solution to another driving solution in order to safely avoid vehicle 100A if it turns out that vehicle 100A was non-cooperating. For example, another driving solution may be maximum yield solution 820, minimum pass solution 830, or some other solution that either passes or yields to non-cooperating vehicle 100A.

In this regard, a switching constraint may be determined for the switching time. The switching constraint may correspond to one or more restricted states of the vehicle (e.g. trajectories for vehicle 100) that the vehicle must avoid in order to be able to switch from the first driving solution to another driving solution at the switching time. The switching constraint may be determined based on the detected agent following a non-cooperating trajectory. The switching constraint may be formulated such that, if the first driving solution satisfies the switching constraint, the vehicle will be able to switch to a second driving solution that avoids collision with the non-cooperating agent. As shown in FIG. 8, a "non-cooperating" constraint 822 may correspond to vehicle 100A performing the non-cooperating trajectory shown in FIG. 6C. For example, the non-cooperating constraint 822 shows that, if vehicle 100 is at a position between x2 and x3 between times t3 and t4, vehicle 100 would likely collide with vehicle 100A. For example, non-cooperating constraint 822 may correspond to overlapping zone 730 of FIG. 7. However, as shown, the non-cooperating constraint 822 is between times t2 and t3, but the times between t2 and t3 are irrelevant for the purpose of switching driving solutions. Therefore, computing device 110 needs to determine a corresponding switching constraint 840 for the switching time ts.

In this regard, the switching constraint for the switching time ts may be determined based on an elevated discomfort level. The elevated discomfort level may be set at a greater value than the global discomfort level. This is because, if the assumption that the agent is cooperating is correct, vehicle 100 may never need to switch to another driving solution. As such, the elevated discomfort level would only be encountered if the switch was actually made. Additionally, the elevated discomfort level may be set smaller than a predetermined maximum discomfort level threshold.

The elevated discomfort level may be determined further based on a probability of the agent following the non-cooperating trajectory. For example, the elevated discomfort level may be expressed as discomfort_elevated= discomfort_global*P(cooperation)+P(non-cooperation), where P(cooperation) is probability that the detected agent has a cooperating trajectory, and P(non-cooperation) is probability that the detected agent has a non-cooperating trajectory. As such, computing device 110 may set a higher elevated discomfort level for a non-cooperating trajectory with a lower probability than a non-cooperating trajectory with a higher probability. To illustrate, the less likely that vehicle 100A has a non-cooperating trajectory as shown in FIG. 6C, the more elevated discomfort computing device 110 is willing to risk as vehicle 100 brakes in response to non-cooperating vehicle 100A.

Figure 9:
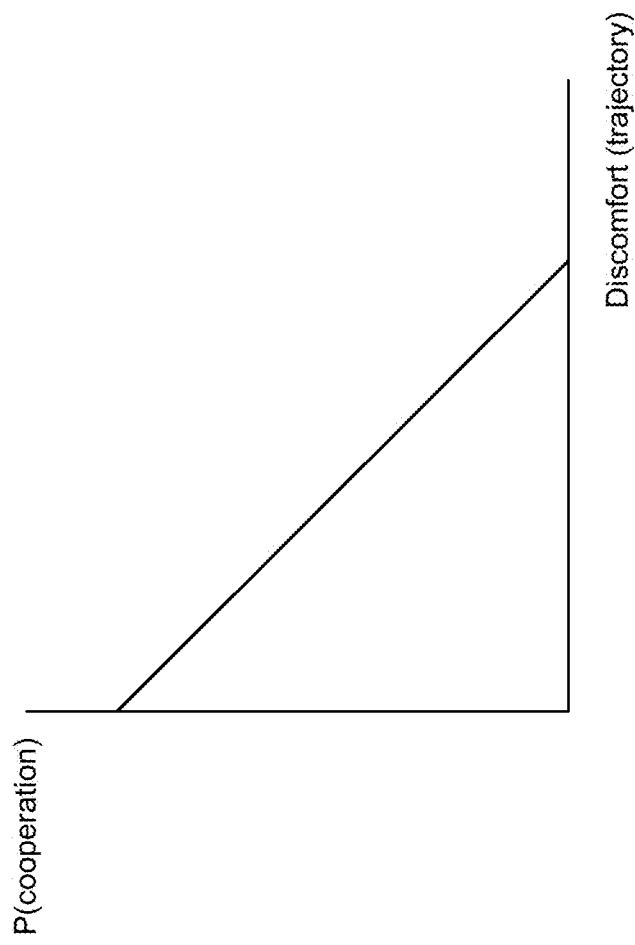
FIG. 9 is an example graph of probability of cooperation as a function of discomfort level.

In some aspects, probability of cooperation or non-cooperation for a detected agent may be based on one or more discomfort levels for performing the trajectory. FIG. 9 shows an example graph 900 of probability of cooperation by a detected agent as a function of discomfort level. Although the example is useful for demonstration purposes, it should not be considered limiting. As shown, when discomfort level for performing a trajectory is 0, probability of cooperation by the agent may be at a maximum. For example, referring back to FIG. 6B, this may be the situation if vehicle 100A can slow down gradually before stopping at stop line 263. As discomfort level increases, the probability of cooperation decreases. For example, referring back to FIG. 6C, this may be the situation if vehicle 100A needs to brake quickly in order to stop at stop line 263. Once discomfort level increases to a threshold, the probability of cooperation may be 0. Probability of cooperation may be alternatively expressed as a percentage. Although graph 900 shows a linear relationship for ease of illustration, in other examples the relationship may be non-linear.

In some cases, probability of cooperation may also be calculated as a yield score based on additional factors than discomfort level. For instance, the yield score may be determined based on a comparison between controls actually applied by the agent with the controls required for cooperation. For example, referring to FIG. 6A, a yield score may be determined based on how hard vehicle 100A is currently braking (decelerating) compared to how much braking (decelerating) is required for vehicle 100A to cooperate with the left turn intended by vehicle 100. For example, the yield score may be set between −1 and 1, where 1 means that a detected agent is certain to yield, and −1 means the detected agent is certain to pass.

As described above, the discomfort level for performing a trajectory may be determined based on a number of factors, such as acceleration, jerk, clearance distance to another agent, etc. For instance, referring to FIG. 6B, in order to stop behind stop line 263, vehicle 100A may decelerate beyond a deceleration threshold, or changes its deceleration too quickly beyond a jerk threshold, each of which may cause discomfort to passenger in vehicle 100A, as well as other road users (such as a vehicle driving behind 100A). Further as discussed above, computing device 110 may assign various discomfort values to vehicle 100A for performing a potential trajectory based on these factors, and choose a maximum value as a discomfort level for the agent in performing the potential trajectory, discomfort_agent (trajectory). In some examples, computing device 110 may determine a global discomfort level for the agent performing the potential trajectory as well as other road users affected by the potential trajectory, discomfort_global(trajectory).

As an alternative to first predicting alternative trajectories, then determining discomfort levels for these trajectories, and finally determining the probabilities of each trajectory based on these discomfort levels, computing device 110 may use one or more behavior models to both predict alternative trajectories and to determine a probability for each trajectory. Such a behavior model may be trained using map information from navigation system 168 and sensor data generated by perception system 172 labeled with yielding and passing trajectories performed on different roads with different traffic patterns. These labels may be generated, for instance, based on determinations manually made by remote operators. The sensor data may include all of the data generated by the perception system 172 before and during a trajectory, or more streamlined information, such as dimensions and shapes of the road on which a trajectory is performed, the pose, velocity, acceleration and similar data for other road users also on the road where the trajectory is performed. The behavior models may include machine learning models, such as a deep neural network.

Determining the switching time and/or the switching constraint may require many iterations involving incrementing the elevated discomfort level. For instance, if a switching constraint cannot be found for the elevated discomfort level initially set, the global discomfort level may be increased, which in turn increases the elevated discomfort level. As such, a new switching time may be calculated based on this increased global discomfort level, and a switching constraint may be determined using the new switching time and the increased elevated discomfort level. For example, initially discomfort_global may be set as 0, and elevated discomfort level may be determined by discomfort_elevated=discomfort_global*P(cooperation)+P(non-cooperation). For example, if P(non-cooperation) is 0.1 and P(cooperation) is 0.9, then discomfort_elevated=0*0.9+0.1=0.1. In the next iteration, discomfort_global may be increased, such as by one predetermined increment, so that discomfort_elevated=[discomfort_global+increment] *P(cooperation)+P(non-cooperation). For example, if the predetermined increment is 0.1, then in next iteration discomfort_elevated=(0+0.1)*0.9+0.1=0.19.

In order to re-calculate a new switching time based on the incremented elevated discomfort level, the confidence threshold for determining a new switching time may be adjusted. For example, the higher the global discomfort level set for a non-cooperating trajectory, the lower the confidence threshold may be, and consequently the earlier the switching time. In some examples, the switching time may be set heuristically. For example, if it is determined that switching time at global discomfort level of 0 is 2 s from current time, and switching time at global discomfort level of 1 is one time increment of the speed planning model, such as 1 ms from current time, switching time for other discomfort levels may be interpolated. Based on the new switching time, computing device 110 may again try to solve for a second driving solution. The process may be repeated many times until a second driving solution is found.

As shown in FIG. 8, the resulting switching constraint 840 for switching time ts represents a restricted range of positions such that, if vehicle 100 can satisfy the switching constraint 840 by avoiding this restricted range of positions at the switching time ts, vehicle 100 would be able to switch to another driving solution that safely avoids the non-cooperating agent causing the non-cooperating constraint 822. In particular in the example in FIG. 8, switching constraint 840 corresponds to restricted positions that vehicle 100 must not be at the switching ts in order to switch to a maximum yield solution 820 or a minimum pass solution 830. The maximum yield solution 820 is the fastest solution vehicle 100 may follow but still able to yield to a non-cooperating vehicle 100A, while the minimum pass solution 830 is slowest solution vehicle 100 may drive but still able to pass a non-cooperating vehicle 100A. As shown, because the first driving solution 810 does not satisfy the switching constraint 840 by avoiding the restricted range of positions at switching time ts, vehicle 100 following the first driving solution 810 would not be able to switch to the maximum yield solution 820 or the minimum pass solution 830 at the switching time ts. Although switching constraint 840 of FIG. 8 is a range of restricted positions, additionally or alternatively, a switching constraint may be restricts on speed or velocity, acceleration, or any of a number of characteristics. For example, another switching constraint may be a restricted range of velocities that vehicle 100 must not have at switching time ts, which may be too slow to pass non-cooperating vehicle 100A yet too fast to yield to non-cooperating vehicle 100A.

Therefore, in this example, the first driving solution 810 needs to be revised based on the switching constraint for the switching time such that, at switching time, vehicle 100 may switch to another driving solution in order to avoid the non-cooperating agent. For example, another driving solution may be the maximum yield solution 820, the minimum pass solution 830, or may be some other driving solution. For example, the first driving solution 810 may be re-calculated based on the current driving settings, traffic control features, and constraints as described above, plus the switching constraint 840 for switching time ts, and further based on the global discomfort level. As illustrated, the example revised first driving solution is a switchable first driving solution 850 which has a segment before switching time ts that allows vehicle 100 to switch to the maximum yield solution 820.

Similar to determining switching time and switching constraint, revising the first driving solution may also require multiple iterations. As such, if a revised first driving solution cannot be found, the global discomfort level may be increased, for example by one predetermined increment. A new first driving solution and a new switching time may be re-calculated based on the new global discomfort level. A new switching constraint may be re-calculated for the new switching time. The first-driving solution may then be revised using the new switching constraint for the new switching time.

Once a switchable revised first driving solution is determined, computing device 110 may operate vehicle 100 according to the switchable revised first driving solution. Further, computing device 110 may operate vehicle 100 by switching from the switchable revised first driving solution to another driving solution at the switching time. For example, the switch may be made if, based on sensor data, computing device 110 determines that the confidence level for the external constraint having the second value corresponding to the non-cooperating trajectory meets the confidence threshold.

Figure 10:
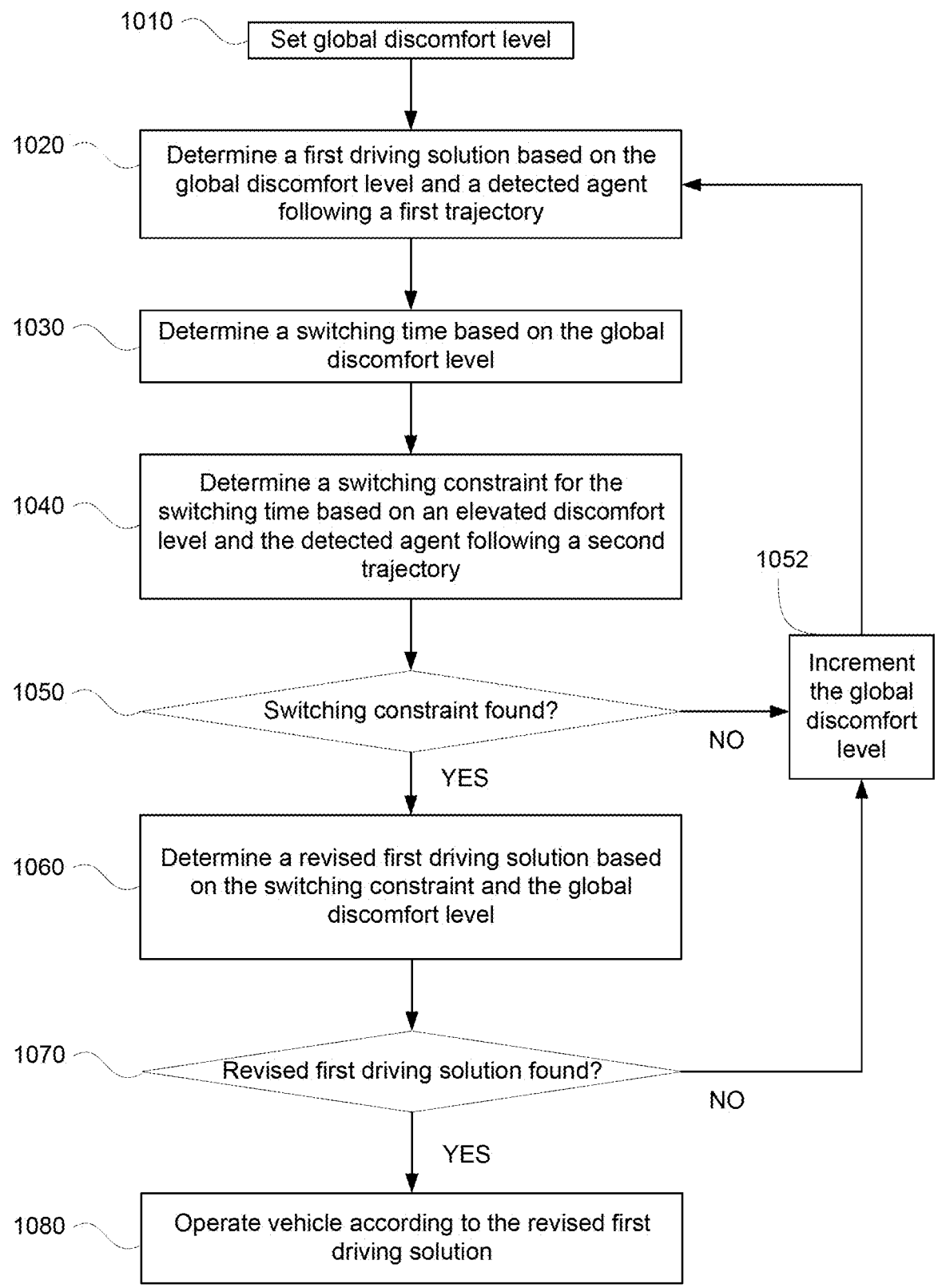
FIG. 10 is an example flow diagram in accordance with aspects of the disclosure.

FIG. 10 is a flow diagram 1000 summarizing the example approach illustrated in FIG. 8. In block 1010, a global discomfort level is set. In block 1020, a first driving solution is determined based on the global discomfort level and a detected agent following a first trajectory. For example, the first driving solution may be first driving solution 810 of FIG. 8 for vehicle 100 to perform left turn at portion 612 of the route, where vehicle 100A is a cooperating agent, as shown in FIG. 6B. In block 1030, a switching time is determined based on the global discomfort level. For example, the switching time may be switching time ts as shown in FIG. 8, where vehicle 100 may need to deviate from the first driving solution 810 in order to avoid colliding with non-cooperating vehicle 100A as shown in FIG. 6C.

In block 1040, a switching constraint for the switching time is determined based on an elevated discomfort level and the detected agent following a second trajectory. For example, as shown in FIG. 8, the switching constraint may be the restricted range of positions shown as switching constraint 840. In block 1050, it is determined whether a switching constraint can be found. If not, in block 1052, the global discomfort level is incremented, and the process returns to block 1020 with the determination of a first driving solution. If yes, in block 1060, the first driving solution is revised based on the switching constraint and the global discomfort level. For example, the revised first driving solution may be the switchable first driving solution 850 shown in FIG. 8, which as shown can switch to maximum yield solution 820 at switching time ts. The switchable first driving solution 850 satisfies the switching constraint 840 since the switchable first driving solution 850 avoids being at the restricted range of positions shown as switching constraint 840. In block 1070, it is determined whether a switchable revised first driving solution can be found. If not, in block 1052, the global discomfort level is incremented, and the process returns to block 1020 with the determination of a first driving solution. If yes, in block 1080, the vehicle is operated according to the switchable revised first driving solution.

However, referring back to FIG. 8, the switchable first driving solution 850 is determined only based on one switching constraint 840 for the switching time ts, and as such, the switchable first driving solution 850 does not account for other constraints, such as other constraint 824. For instance, as shown in FIG. 8, other constraint 824 may correspond to a second detected agent in the environment of vehicle 100 following a non-cooperating trajectory. Further as shown in FIG. 8, if vehicle 100 switches from the revised switchable first driving solution 850 to maximum yield solution 820, vehicle 100 will likely collide with the second detected agent causing the other constraint 824.

Figure 11:
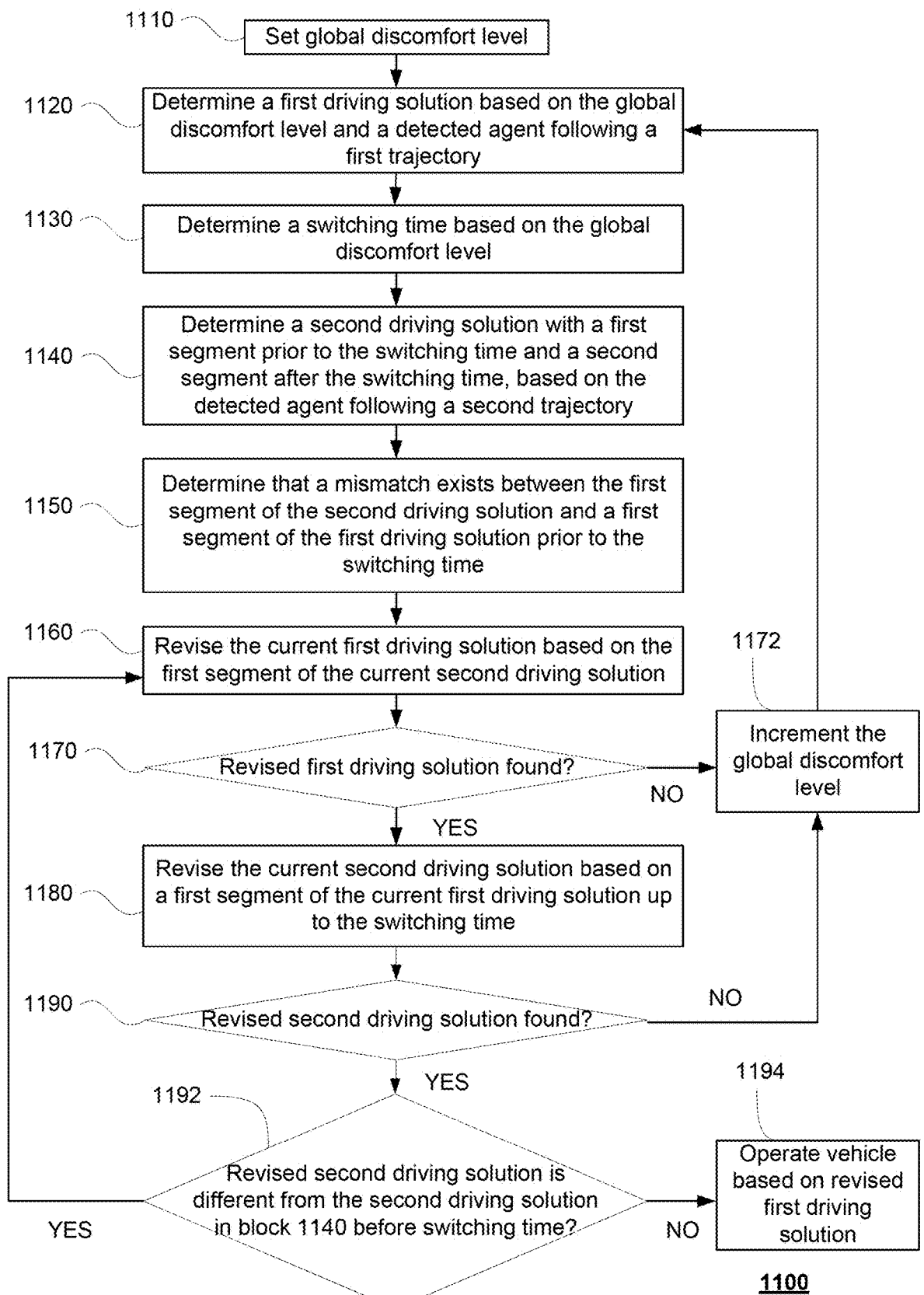
FIG. 11 is another example flow diagram in accordance with aspects of the disclosure.
Figure 12:
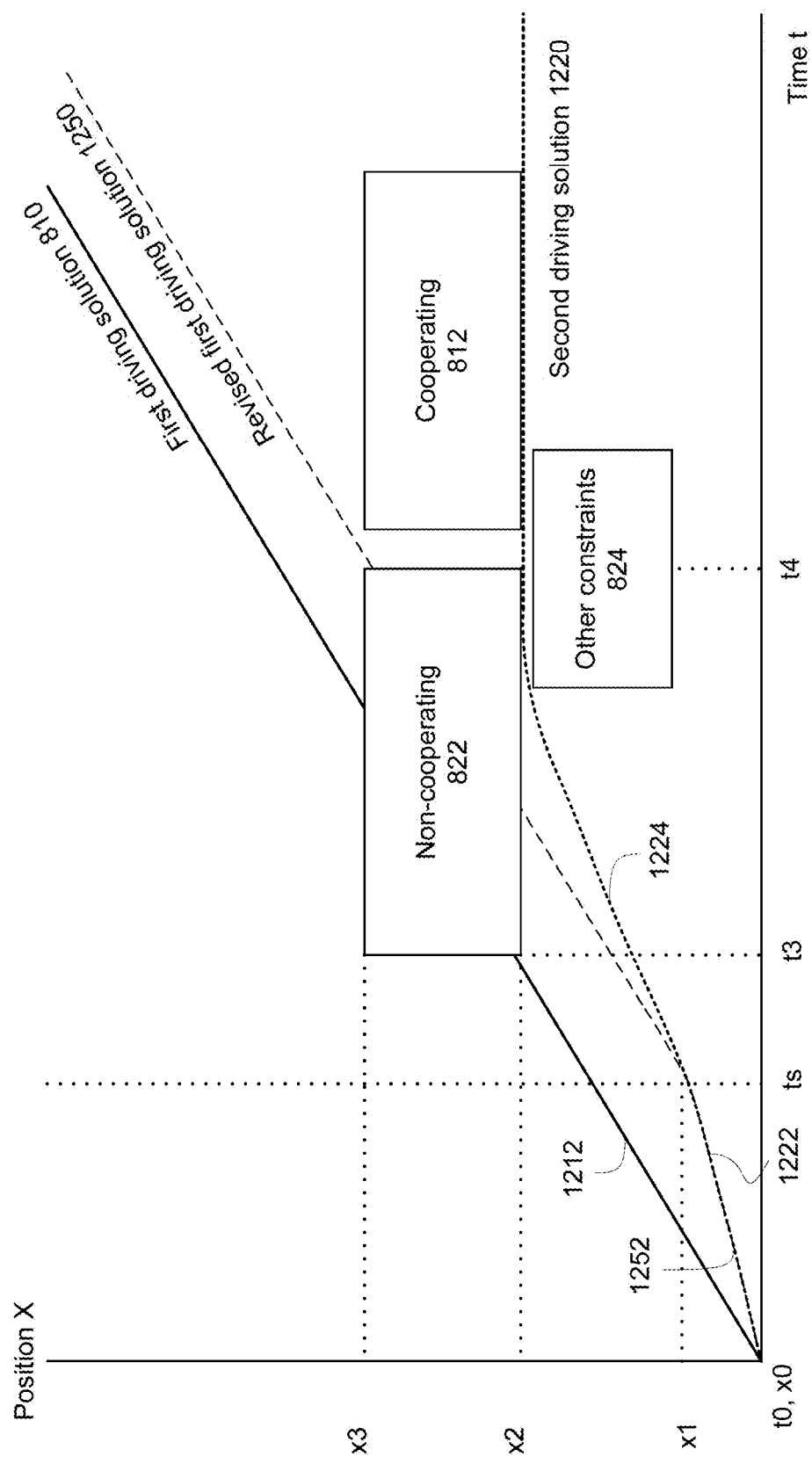
FIG. 12 is another example graphical representation of various driving solutions determined based on another example methods.

In this regard, another example approach, which may be configured to account for multiple constraints, may be used to revise the first driving solution. FIG. 11 is an example flow diagram 1100 summarizing the alternative example approach for revising the first driving solution. FIG. 12 shows an example graphical representation 1200 of various driving solutions determined using the example method of FIG. 11. FIGS. 12 and 8 have many similar features, and labeled as such.

Referring to FIG. 11, in block 1110, a global discomfort level is set. In block 1120, a first driving solution is determined based on the global discomfort level and a detected agent following a first trajectory. For example, the first driving solution may be first driving solution 810 in FIG. 12 for vehicle 100 to perform left turn at portion 612 of the route, where vehicle 100A is a cooperating agent, as shown in FIG. 6B. In block 1130, a switching time is determined based on the global discomfort level. For example, the switching time may be switching time ts as shown in FIG. 12, where vehicle 100 may need to deviate from the first driving solution 810 in order to avoid colliding with non-cooperating vehicle 100A as shown in FIG. 6C.

In block 1140, a second driving solution is determined with a first segment prior to the switching time and a second segment after the switching time, based on the detected agent following a second trajectory, such as the non-cooperating trajectory of vehicle 100A shown in FIG. 6C. The second driving solution may be determined based on current driving settings, traffic control features, and one or more constraints as discussed above with respect to the first driving solution. For example, current driving settings may include the current speed, acceleration, direction, and heading of the vehicle. Traffic control features may include lane lines, signs, traffic lights, speed limits, etc. Since the second driving solution is determined based on one or more non-cooperating agents, the external constraints may include a "non-cooperating" constraint 822 as shown in FIG. 12. For instance, the non-cooperating constraint 822 may correspond to vehicle 100A performing the trajectory shown in FIG. 6C. With respect to the internal constraints, the second driving solution may be determined based on setting a higher discomfort level than the global discomfort level than for the first driving solution. This is because, as the back-up or less preferred or less likely driving solution, the second driving solution may never be used if the assumption that the detected agent is cooperating is correct. As discussed above, the elevated discomfort level may be determined based on a probability of the non-cooperating trajectory.

As such, the first segment of the second driving solution may be determined further based on the global discomfort level, while the second segment of the second driving solution may be determined based on the elevated discomfort level higher than the global discomfort level. For example, as shown in FIG. 12, the second driving solution may be second driving solution 1220 that yields to non-cooperating vehicle 100A. Further as shown in FIG. 12, the second driving solution 1220 has a first segment 1222 prior to switching time ts, and a second segment 1224 after the switching time ts.

In block 1150, a mismatch between the first segment of the second driving solution and a first segment of the first driving solution prior to the switching time is determined. For example as shown in FIG. 12, there is a mismatch between the first segment 1222 of the second solution 1220 and the first segment 1212 of the first driving solution 810. These mismatches, as described above, may be a position or velocity mismatch at one or more points between these segments. As such, the mismatch prevents vehicle 100 from switching from the first driving solution 810 to the second driving solution 1220 at the switching time ts.

In block 1160, the current first driving solution is revised based on the first segment of the current second driving solution before the switching time. For instance continuing from the example above, the current first driving solution is first driving solution 810 and the current second driving solution is second driving solution 1220. As such, the first driving solution 810 may be re-calculated based on the first segment 1222 of the second driving solution 1220, the global discomfort level after the switching time, and based on the detected agent following the first trajectory. For instance, the first driving solution 810 may be re-calculated such that its speed and position at switching time ts matches the speed of the second driving solution 1220. For example, as shown in FIG. 12, an example revised first driving solution 1250 has a first segment before switching time 1252 that is identical to the first segment 1222 of the second driving solution 1220. For instance as shown, the revised first driving solution 1250 and the second driving solution 1220 have the same speed and position at the switching time ts. In block 1170, it is determined whether the revised first driving solution can be found. If not, in block 1172, the global discomfort level is incremented, and the process returns to block 1120 with the determination of a first driving solution.

If yes, in block 1180, the current second driving is revised based on a first segment of the current first driving solution before the switching time. For instance continuing from the example above, the current first driving solution is the revised first driving solution 1250 and the current second driving solution is the second driving solution 1220. As such, the second driving solution 1220 may be re-calculated based on the first segment 1252 of the revised first driving solution 1250, the elevated discomfort level after the switching time, and based on the detected agent following the second trajectory. In block 1190, it is determined whether revised second driving solution can be found. If not, in block 1172, the global discomfort level is incremented, and the process returns to block 1120 with the determination of a first driving solution.

If yes, in block 1192, it is determined whether the revised second driving solution is different from the second driving solution in block 1140 before the switching time. If yes, the process returns to block 1160, where the current first driving solution is revised based on the first segment of the current second driving solution. For example, the revised second driving solution in block 1180 may have a first segment before switching time ts that is different from the first segment 1222 of the second driving solution in block 1140. As such, the current first driving solution, which at this point is revised first driving solution 1250, needs to be revised again based on the first segment before the switching time of the revised second driving solution. If not, in block 1194, the vehicle is operated based on the revised first driving solution. For example, the revised second driving solution in block 1180 may have a first segment same as segment 1222. As such, the current first driving solution, which at this point is revised first driving solution 1250, which had already been revised based on segment 1222, need not be revised again. In other words, the flow diagram 1100 ensures that the resulting first driving solution and the second driving solution have the same first segment before the switching time.

Further as discussed above, the example approach shown in FIGS. 11 and 12 may be readily extended to finding driving solutions for more than one constraints. For example, computing device 110 may determine that a second detected agent, in addition to vehicle 100A, also has multiple possible trajectories, such as a cooperating trajectory and a non-cooperating trajectory. For instance, the non-cooperating trajectory of the second detected agent may create other constraint 824. As such, a first driving solution may be determined based on all detected agents following cooperating trajectories. A second driving solution may be determined based on the vehicle 100A following a non-cooperating trajectory as described above. A third driving solution may be determined based on the second detected agent following a non-cooperating trajectory. Thereafter, the three solutions may be revised iteratively. For example, the current first driving solution may be revised based on a first segment of the current third driving solution before the switching time, the current second driving solution may be revised based on a first segment of the current first driving solution before the switching time, and the current third driving solution may be revised based on a first segment of the current second driving solution before the switching time, and so on. The iterations may continue until all three driving solutions have the same first segment before the switching time.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
    receiving, by one or more computing devices, a non-cooperating trajectory for an agent detected in an environment of a vehicle;
    determining, by the one or more computing devices based on the non-cooperating trajectory, a switching constraint for switching from a first driving solution for the vehicle along a portion of a route to a second driving solution;
    revising, by the one or more computing devices, the first driving solution based on the switching constraint; and
    operating, by the one or more computing devices, the vehicle based on the revised first driving solution.

2. The method of claim 1, further comprising determining, by the one or more computing devices, a switching time for switching from the first driving solution to the second driving solution; and
    wherein determining the switching constraint is further based on the switching time.

3. The method of claim 2, wherein determining the switching time includes determining a confidence level that the agent is following the non-cooperating trajectory.

4. The method of claim 3, wherein determining the switching time further includes identifying a future time based on the confidence level and a confidence threshold.

5. The method of claim 3, wherein determining the confidence level is based on a predicted state of the agent for the non-cooperating trajectory.

6. The method of claim 5, wherein the predicted state includes a predicted position of the agent.

7. The method of claim 5, wherein the predicted state includes a predicted velocity of the agent.

8. The method of claim 1, wherein determining the switching constraint is based on an elevated discomfort level higher than a global discomfort level.

9. The method of claim 8, further comprising determining, by the one or more computing devices, the elevated discomfort level based on a probability of the agent following the non-cooperating trajectory.

10. The method of claim 1, wherein the second driving solution includes the vehicle passing or yielding to the agent.

11. The method of claim 1, wherein the switching constraint includes one or more restricted velocities to be avoided by the vehicle.

12. A system comprising:
    a memory storing instructions, the instructions including a module for determining driving solutions for a vehicle; and
    one or more computing devices in communication with the memory, the one or more computing devices being configured to:
    receive a non-cooperating trajectory for an agent detected in an environment of the vehicle;
    determine, based on the non-cooperating trajectory, a switching constraint for switching from a first driving solution to a second driving solution;
    revise the first driving solution based on the switching constraint; and
    operate the vehicle based on the revised first driving solution.

13. The system of claim 12, wherein the one or more computing devices are further configured to:
    determine a switching time for switching from the first driving solution to the second driving solution; and
    determine the switching constraint further based on the switching time.

14. The system of claim 13, wherein the one or more computing devices are further configured to:
- determine a confidence level that the agent is following the non-cooperating trajectory; and
- determine the switching time further based on the confidence level.

15. The system of claim 14, wherein the one or more computing devices are further configured to:
- identify a future time based on the confidence level and a confidence threshold; and
- determine the switching time further based on the future time.

16. The system of claim 14, wherein the one or more computing devices are further configured to determine the confidence level based on a predicted state of the agent for the non-cooperating trajectory.

17. The system of claim 16, wherein the predicted state includes a predicted position of the agent.

18. The system of claim 16, wherein the predicted state includes a predicted velocity of the agent.

19. The system of claim 12, wherein the second driving solution includes the vehicle passing or yielding to the agent.

20. The system of claim 12, wherein the switching constraint is determined based on an elevated discomfort level higher than a global discomfort level.

21. The system of claim 12, further comprising the vehicle.

22. The system of claim 12, wherein the switching constraint includes one or more restricted positions to be avoided by the vehicle.

* * * * *